United States Patent
Kent et al.

(10) Patent No.: US 10,015,175 B2
(45) Date of Patent: Jul. 3, 2018

(54) DETECTING ANOMALOUS BEHAVIOR VIA USER AUTHENTICATION GRAPHS

(71) Applicants: Los Alamos National Security, LLC, Los Alamos, NM (US); New Mexico Tech Research Foundation, Socorro, NM (US)

(72) Inventors: Alexander Kent, Los Alamos, NM (US); Joshua Neil, Los Alamos, NM (US); Lorie Liebrock, Socorro, NM (US)

(73) Assignees: Los Alamos National Security, LLC, Los Alamos, NM (US); New Mexico Tech Research Foundation, Socorro, NM (US)

(*) Notice: Subject to any disclaimer, the term of this patent is extended or adjusted under 35 U.S.C. 154(b) by 113 days.

(21) Appl. No.: 15/099,898

(22) Filed: Apr. 15, 2016

(65) Prior Publication Data
US 2016/0308884 A1   Oct. 20, 2016

Related U.S. Application Data

(60) Provisional application No. 62/148,228, filed on Apr. 16, 2015.

(51) Int. Cl.
*H04L 29/06* (2006.01)
*H04L 29/08* (2006.01)
(Continued)

(52) U.S. Cl.
CPC ........ *H04L 63/1408* (2013.01); *G06F 21/316* (2013.01); *G06F 21/552* (2013.01);
(Continued)

(58) Field of Classification Search
CPC .............................. H04L 63/083; H04L 67/22
See application file for complete search history.

(56) References Cited

U.S. PATENT DOCUMENTS 6,662,230 B1 * 12/2003 Eichstaedt ............. G06F 21/62
709/217
8,312,540 B1 * 11/2012 Kahn .................... G06F 21/552
713/183

(Continued)

OTHER PUBLICATIONS

Chen, Y., Nyemba, S., Zhang, W. and Malin, B., 2012. Specializing network analysis to detect anomalous insider actions. Security informatics, 1(1), p. 5.*

(Continued)

*Primary Examiner* — James R Turchen
(74) *Attorney, Agent, or Firm* — LeonardPatel P.C.; Michael Aristo Leonard, II; Sheetal S. Patel

(57) ABSTRACT

Significant and aggregate user authentication activity may be analyzed across a population of users and computers in one or more networks to differentiate between authorized users and intruders in a network, and/or to detect inappropriate behavior by otherwise authorized users. Dynamic graphs and graph models over user and computer authentication activity, including time-constrained models, may be used for the purposes of profiling and analyzing user behavior in computer networks. More specifically, an edge-based breadth first search of graphs may be used that enforces time-constraints while maintaining traditional breadth first search computational complexity equivalence.

13 Claims, 21 Drawing Sheets

(51) Int. Cl.
G06F 21/31 (2013.01)
G06F 21/55 (2013.01)
G06K 9/62 (2006.01)

(52) U.S. Cl.
CPC ......... *G06F 21/554* (2013.01); *G06K 9/6277* (2013.01); *H04L 63/08* (2013.01); *H04L 63/083* (2013.01); *H04L 67/22* (2013.01)

(56) References Cited

U.S. PATENT DOCUMENTS

| | | | | |
|---|---|---|---|---|
| 8,490,190 | B1* | 7/2013 | Hernacki | H04L 63/1425 726/23 |
| 9,602,526 | B2* | 3/2017 | Liu | H04L 63/107 |
| 2010/0095374 | A1* | 4/2010 | Gillum | G06Q 30/02 726/22 |
| 2014/0068769 | A1* | 3/2014 | Neil | H04L 63/1433 726/23 |
| 2014/0181968 | A1* | 6/2014 | Ge | H04L 63/1416 726/23 |
| 2014/0280902 | A1* | 9/2014 | Szamonek | H04L 61/2007 709/224 |

OTHER PUBLICATIONS

Hogan, E., Johnson, J.R. and Halappanavar, M., Jan. 2013, Graph coarsening for path finding in cybersecurity graphs. In Proceedings of the Eighth Annual Cyber Security and Information Intelligence Research Workshop (p. 7). ACM.*

Eberle, W., Graves, J. and Holder, L., 2010. Insider threat detection using a graph-based approach. Journal of Applied Security Research, 6(1), pp. 32-81.*

Neil, J., Hash, C., Brugh, A., Fisk, M. and Storlie, C.B., 2013. Scan statistics for the online detection of locally anomalous subgraphs. Technometrics, 55(4), pp. 403-414.*

Graphs and Graph Models, Section 10.1; retreived from: http://homepage.cs.uri.edu/faculty/hamel/courses/2012/fall2012/csc447/lecture-notes/csc447-ln021.pdf on Jan. 9, 2018; posted on Nov. 26, 2012.*

Alexander D. Kent and Lorie M. Liebrock, "Differentiating User Authentication Graphs," 2013 IEEE Security and Privacy Workshops (SPW), http://www.ieee-security.org/TC/SPW2013/papers/data/5017a072.pdf (May 23-24, 2013).

Andrew P. Bradley, "The Use of the Area under the ROC Curve in the Evaluation of Machine Learning Algorithms," Pattern Recognition, vol. 30, No. 7, pp. 1145-1149 (1997).

Chris Hummel, "Why Crack When You Can Pass the Hash?," SANS Institute InfoSec Reading Room, https://www.sans.org/reading-room/whitepapers/testing/crack-pass-hash-33219 (2009).

Diane Lambert and Chuanhai Liu, "Adaptive Thresholds," Journal of the American Statistical Association, vol. 101, No. 473, pp. 78-88 (Mar. 2006).

G. A. Barnard, "Control Charts and Stochastic Processes," Journal of the Royal Statistical Society, Series B, vol. XXI, No. 2 (1959).

Leo Breiman, "Random Forests," Machine Learning, vol. 45, pp. 5-32 (2001).

Ron Kohavi, "A Study of Cross-Validation and Bootstrap for Accuracy Estimation and Model Selection," International Joint Conference on Artificial Intelligence (IJCAI), http://web.cs.iastate.edu/~jtian/cs573/Papers/Kohavi-IJCAI-95.pdf (1995).

* cited by examiner

| Iteration | NextPass | VisitedArcs | VertexDistances |
|---|---|---|---|
| 0) | {((A,B),5), ((A,C),1)} | ∅ | ∅ |
| 1) | {((C,B),2)} | {(A,B), (A,C)} | {B:1, C:1} |
| 2) | {((B,D),3)} | {(A,B), (A,C), (C,B)} | {B:1, C:1} |
| 3) | ∅ | {(A,B), (A,C), (C,B), (B,D)} | {B:1, C:1, D:3} |

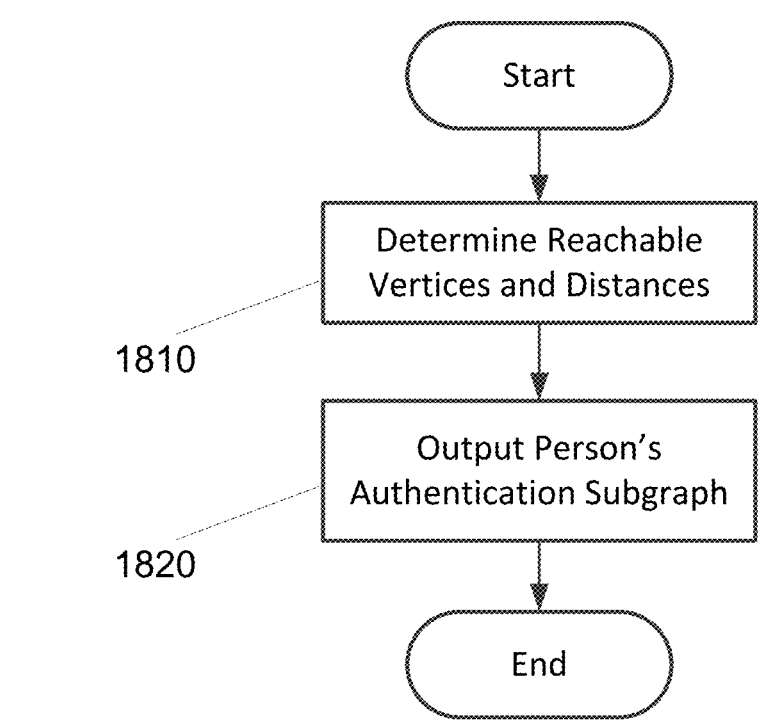

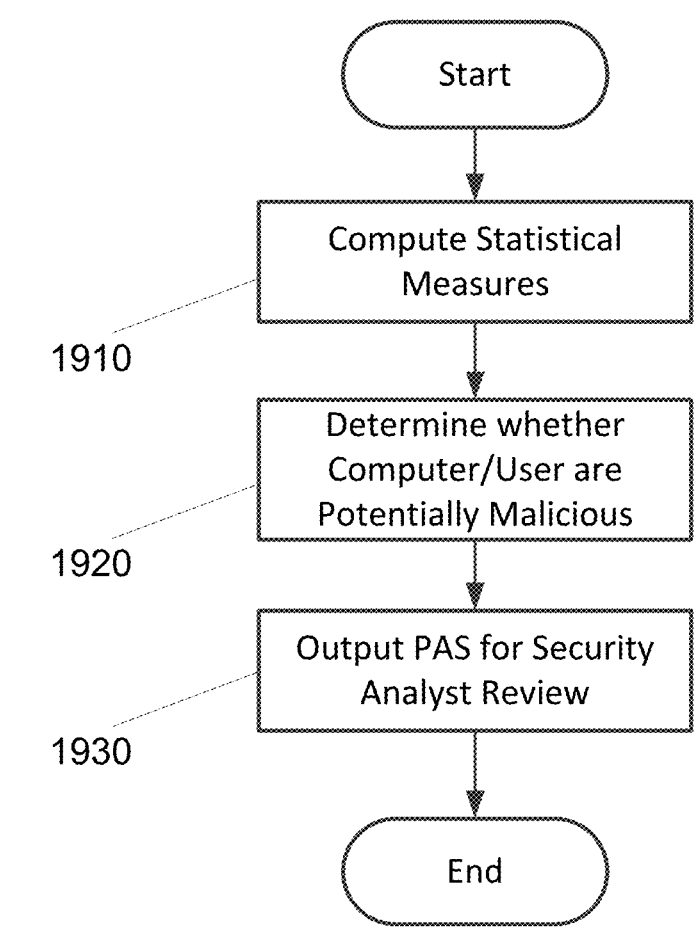

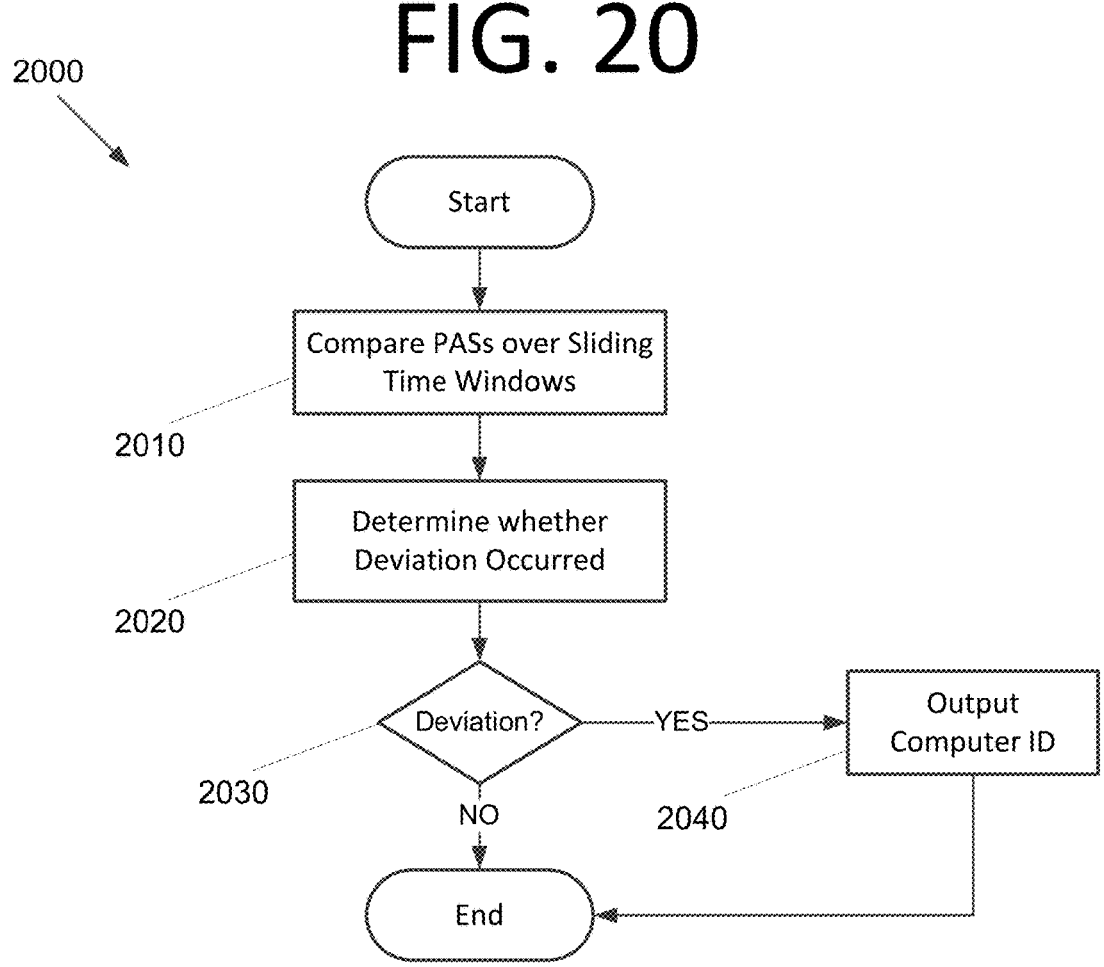

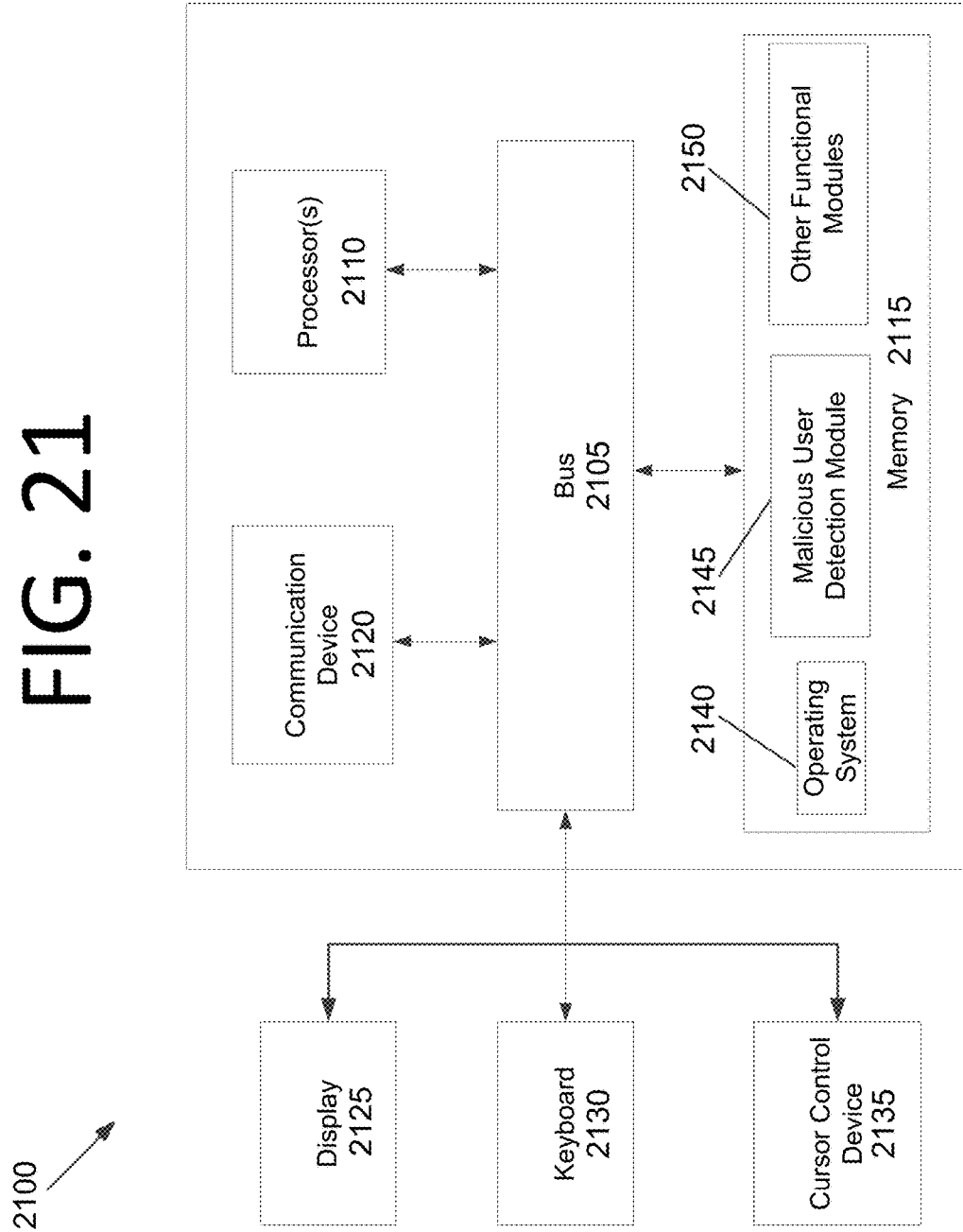

DETECTING ANOMALOUS BEHAVIOR VIA USER AUTHENTICATION GRAPHS

CROSS REFERENCE TO RELATED APPLICATION

This application claims the benefit of U.S. Provisional Patent Application No. 62/148,228 filed Apr. 16, 2015. The subject matter of this earlier filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to user differentiation, and more particularly, to differentiating between authorized users and unauthorized, potentially malicious, users in a network, as well as detecting inappropriate, potentially malicious, behavior by otherwise authorized users.

BACKGROUND

User authentication is a fundamental aspect of modern computer use. Authentication enables computer systems to recognize specific users through a shared secret or other jointly recognized mechanism. User authentication can take the form of a simple username and secret password or involve more complex methods of identity involving varying factors (e.g., biometrics, fingerprint scans, etc.). Within enterprise computer environments, users often authenticate to many computer systems and applications throughout the network. In this environment, authentication activities are often provided by a unified network authentication mechanism. This network authentication capability and its encompassing centralized account management are a mainstay of modern information technology (IT) administration. Without it, significant challenges would exist to manage accounts and authentication credentials across large numbers of individual systems.

Centralized management and authentication is considered both a best practice and an expectation in the IT infrastructure of most large organizations. Because network authentication events are generated for many activities, including access to applications and information of importance to an organization, these events provide significant insight into the behavior of the authenticating users. In addition, because this user authentication activity implies directional relationships between computers within an enterprise network, they can be represented as directed graphs or digraphs. These user authentication graphs provide a useful representation, enabling a platform for behavioral analytics based on a variety of induced graph attributes.

FIG. 1 illustrates two login events 100 and an induced directional graph 110. Two example log messages 102, 104 for a user U1 where computer access was granted are shown—one for computer IP address 192.168.0.1 (i.e., computer C1) accessing computer C2 and another for the same IP address accessing computer C3. Induced directional graph 110 from log messages 102, 104 is also shown.

However, while it is possible to represent user behavior with graphs, there is currently no effective way to differentiate between authorized users and unauthorized, potentially malicious, users (also referred to as "intruders" herein) in a network based solely on authentication events. There is also currently no effective way to detect inappropriate, potentially malicious, authentication behavior by otherwise authorized users. Accordingly, applying user graphical analysis to engender solutions to these two problems may be beneficial.

SUMMARY

Certain embodiments of the present invention may provide solutions to the problems and needs in the art that have not yet been fully identified, appreciated, or solved by conventional user differentiation technologies. For example, some embodiments pertain to analyzing significant and aggregate user authentication activity across a population of users and computers in one or more networks to differentiate between authorized users and intruders in a network, and/or to detect inappropriate behavior by otherwise authorized users.

In an embodiment, a computer-implemented method includes determining, by a computing system, a set of reachable vertices and a respective distance to each of the reachable vertices from a starting vertex within a graph. The set of reachable vertices represent other computers that a computer, represented by the starting vertex, has authenticated to during a period of time on behalf of its user. The computer-implemented method also includes outputting the set of reachable vertices and the respective distance to each of the vertices, by the computing system, as a Person's Authentication Subgraph (PAS) for the starting vertex of the graph.

In another embodiment, a computer-implemented method includes determining, by a computing system, that a computer or its user is potentially malicious by computing statistical measures to compare one or more attributes of a PAS based on user authentication events for the computer with one or more attributes indicative of normal user behavior. The computer-implemented method also includes estimating, by the computing system, a statistical model for baseline behavior of the attributes and evaluating probabilities of observed attributes, by the computing system, under the baseline models. The computer-implemented method further includes outputting the PAS, by the computing system, for review by a security analyst to determine whether the PAS represents a compromised computer or malicious user when the PAS exceeds a statistical threshold.

In yet another embodiment, a computer-implemented method includes comparing, by a computing system, a plurality of PASs for a computer over a series of sliding time windows and determining, by the computing system, based on a statistical comparison of the PASs, whether a deviation between an estimated statistical model and observed PAS attributes at a given time window exceeds an expected deviation for a user. When the expected deviation for the user has been exceeded, the computer-implemented method also includes outputting an identification of the computer, the computing system, for review by a security analyst to determine whether the computer has been compromised or a malicious user is using the computer.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 18 is a flowchart illustrating a process for determining a PAS, according to an embodiment of the present invention.

FIG. 19 is a flowchart illustrating a process for determining a PAS for review by a security analyst, according to an embodiment of the present invention.

FIG. 20 is a flowchart illustrating a process for identifying potentially malicious computers or users, according to an embodiment of the present invention.

FIG. 21 is a block diagram illustrating a computing system configured to differentiate between authorized users and intruders in a network, and/or to detect inappropriate behavior by otherwise authorized users, according to an embodiment of the present invention.

DETAILED DESCRIPTION OF THE EMBODIMENTS

Some embodiments of the present invention pertain to differentiating between authorized users and intruders in a network and/or detecting inappropriate authentication behavior by otherwise authorized users. In the latter case, an otherwise authorized user may change behavior due to an impersonation, bribe, blackmail, change in sympathies, etc. Dynamic graphs and graph models over user and computer authentication activity, including time-constrained models, may be used for the purposes of profiling and analyzing user behavior in computer networks. More specifically, an edge-based breadth first search of graphs may be used that enforces time-constraints while maintaining traditional breadth first search computational complexity equivalence. This search approach may have applicability beyond user authentication graphs and relevant to any time-constrained needs in graph analysis.

Authentication Subgraphs

Figure 1:
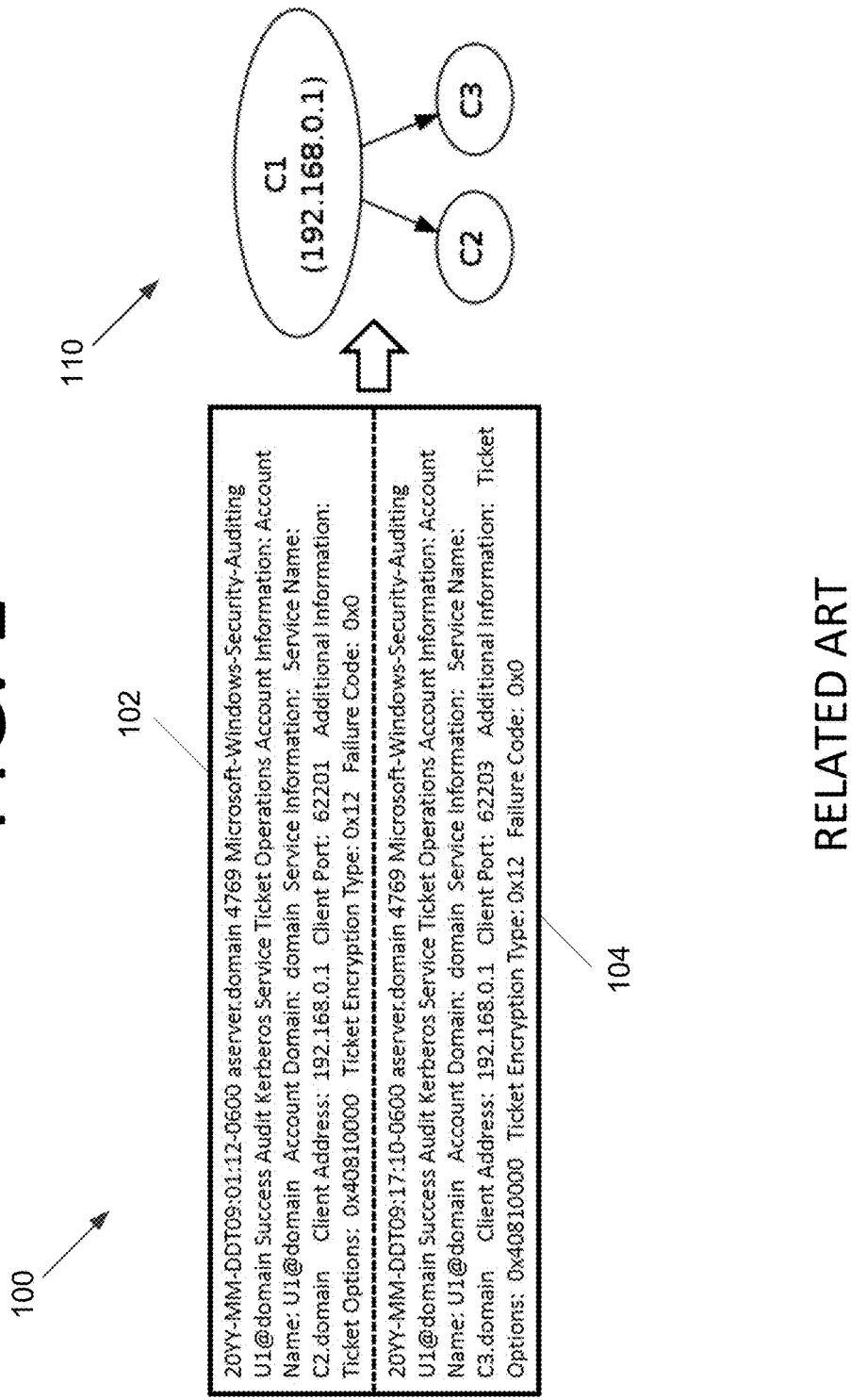
FIG. 1 illustrates two login events and an induced directional graph.
Figure 2:
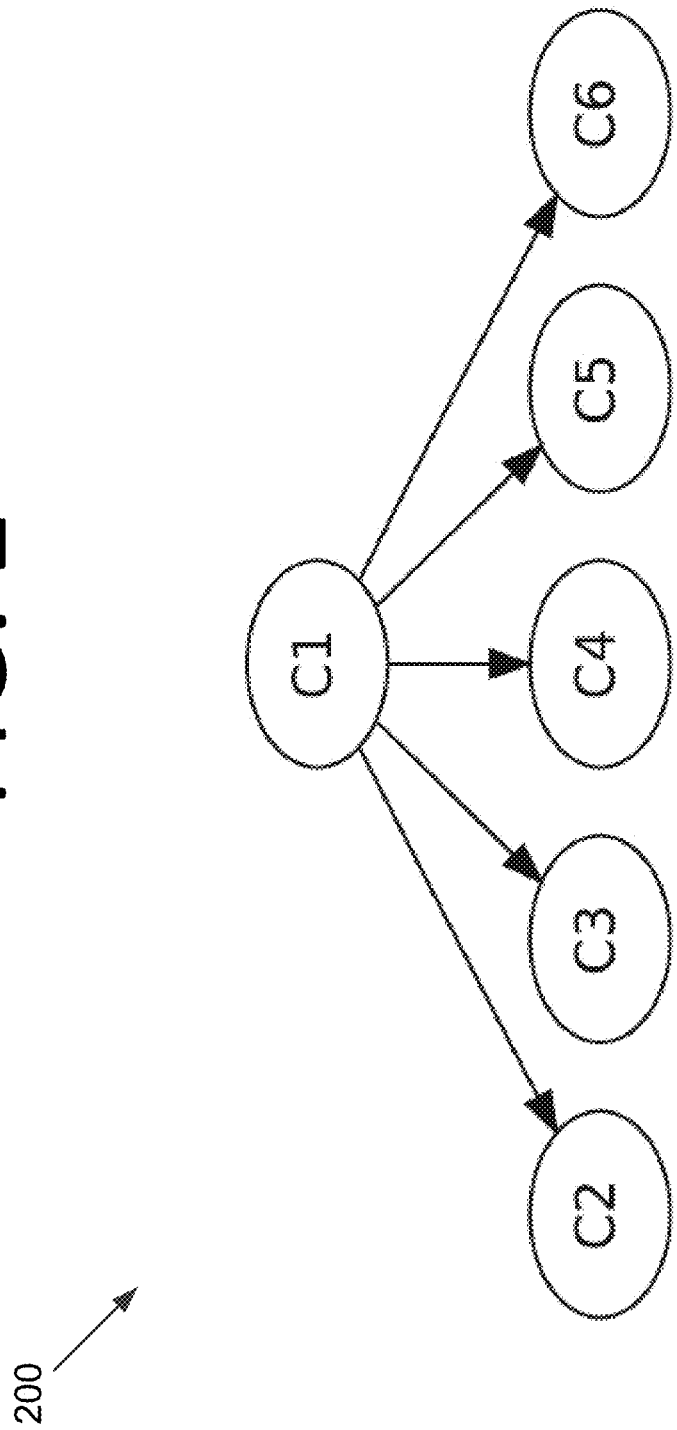
FIG. 2 is a graph 200 illustrating a typical Person's Authentication Subgraph (PAS) representing a single user's authentication activity across an example one-year data set, according to an embodiment of the present invention.
Figure 3:
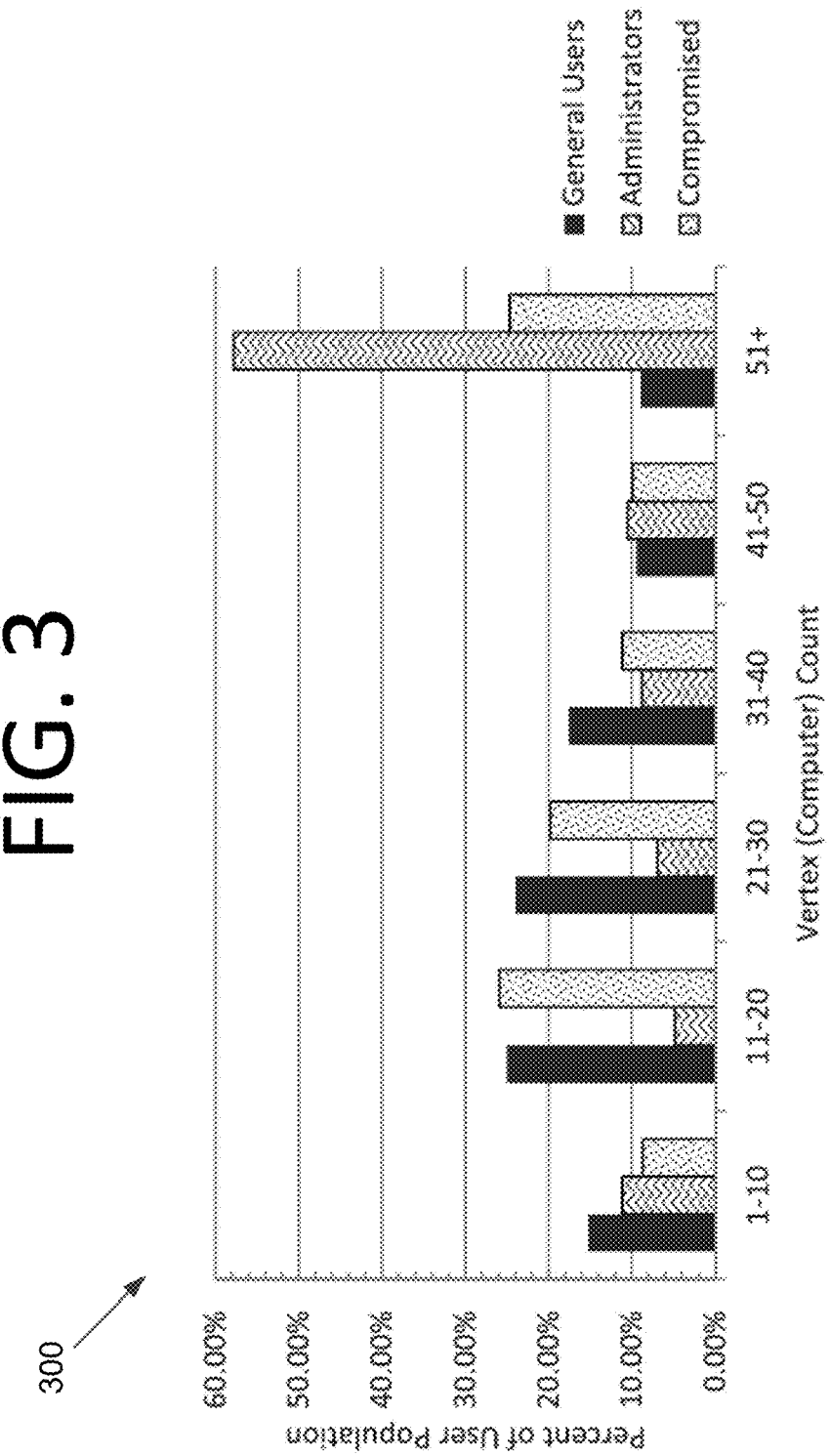
FIG. 3 is a graph illustrating a histogram of the number of vertices a PAS may have, according to an embodiment of the present invention.
Figure 4:
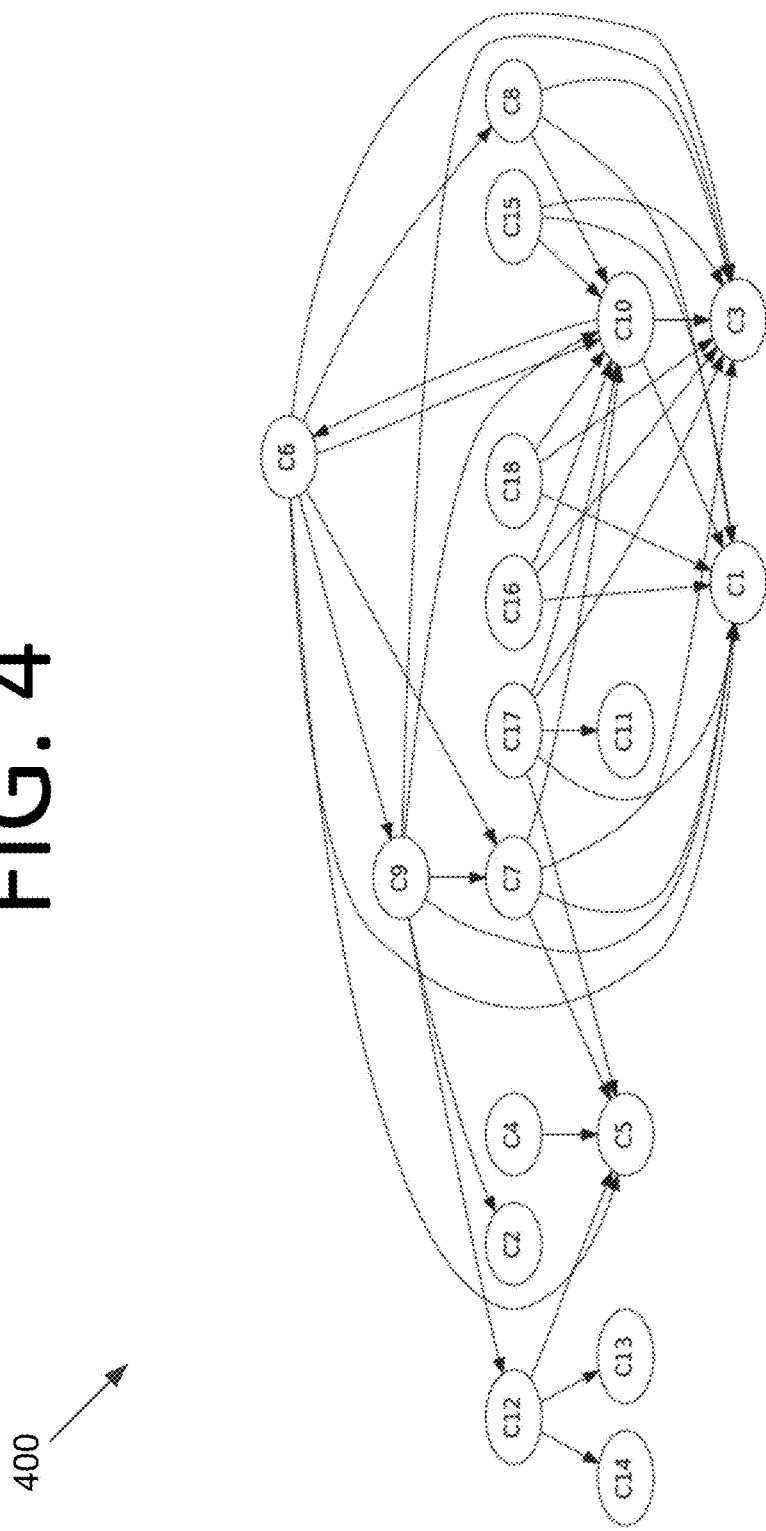
FIG. 4 is a network authentication graph from a typical user with administrative access, according to an embodiment of the present invention.

Directed graphs representing each user's authentication activity over a time period are referred to as herein as a Person's Authentication Subgraph (PAS). FIG. 2 is a graph 200 illustrating a typical PAS representing a single user's authentication activity across an example one-year data set, according to an embodiment of the present invention. Differentiating and exploring the attributes of individual PASs from real datasets yields useful results. It was found that most users have a static set of systems that they authenticate to over time, reflecting how static most users' authentication activity is within the network, as seen with representative user C1 in FIG. 2. Graph 300 of FIG. 3 illustrates a histogram of the number of vertices an example PAS may have and also shows that administrative users generally have larger, more complex graphs compared to general users, as seen within the tail. This increased complexity of administrative users can be seen in graph 400 of FIG. 4 as well. In FIG. 4, the network authentication graph $G_u$ is shown for a typical user u with administrative access. The user here accessed 18 computers ($|V_u|=18$) with 41 authentication arcs ($|A_u|$=41). This graph has a diameter of 5 ($D_u$=5) and a time-constrained diameter of 4 ($\vec{D}_u$=4). Graph 400 represents a more complex authentication graph as compared to that of most general users.

More specifically, a PAS may be defined as the directed subgraph $G_u$ ($V_u$, $A_u$) for a user u representing the user's authentication activity over some predefined time period. The vertex set $V_u$ is defined as the computers that user u has one or more authentication events with. The arc set $A_u$ represents the authentication activity from one computer to another for user u within the network. These arcs may be represented individually as (x,y), indicating the directed edge from vertex x to vertex y. An arc may represent more than one authentication event in cases where there are multiple authentication events from x to y within the time period of the PAS. A more complete list of variables and descriptions can be found in Table 1 below.

TABLE 1

VARIABLES AND ASSOCIATED DESCRIPTIONS

| Variable | Description |
|---|---|
| $G_u$ | PAS for user u |
| v | Graph vertex |
| $V_u$ | Vertex set for PAS u |
| $|V_u|$ | Number of vertices in PAS u |
| (x, y) | Graph arc connecting vertex x to vertex y |
| $A_u$ | Arc set for PAS u |
| $|A_u|$ | Number of arcs in PAS u |
| $P_u$ ($v_1$, $v_n$) | Set of arc paths from vertex $v_1$ to vertex $v_n$ in PAS u |
| $|P_u$ (x, y)$|$ | Path length from x to y in PAS u |
| d (x, y) | Shortest path distance from x to y |
| $D_u$ | Graph diameter of PAS u |
| $\vec{P}_u$ ($v_1$, $v_n$) | Time-constrained arc path in PAS u |
| $\vec{d}$ (x, y) | Time-constrained path distance |
| $\vec{D}_u$ | Time-constrained graph diameter of PAS u |
| $\rho_u$ | Directed graph density of PAS u |
| $C_u$ | Connected component set of PAS u |
| $|C_u|$ | Connected component count of PAS u |
| $deg^-$ (v) | Indegree of vertex v |
| $deg^+$ (v) | Outdegree of vertex v |
| $O_u$ | Outstar vertex set for PAS u |
| $I_u$ | Instar vertex set for PAS u |
| $Z_u$ | Isolated vertex set for PAS u |
| $T_u$ | Transit vertex set for PAS u |
| $L_u$ | Pseudo-leaf vertex set for PAS u |
| $S_u$ | Entropy of indegree values for PAS u |
| $S_u\vec{P}$ | Entropy of time-constrained path lengths for PAS u |
| $S_{uVT}$ | Entropy of vertex type counts for PAS u |
| $t_{first}$ (x, y) | First time arc (x, y) was observed within authentication data defining $G_u$ |
| $t_{last}$ (x, y) | Last time arc (x, y) was observed within authentication data defining $G_u$ |

A path may be defined as a sequence of arcs from vertex $v_1$ to vertex $v_n$ in $G_u$:

$$P_u(v_1,v_n)=((v_1,v_2), \ldots ,(v_{i-1},v_i),(v_i,v_{i+1}), \ldots ,(v_{n-1}, v_n)) \text{ such that } (v_j,v_{j+1})\in A_u, j=1, \ldots ,n-1 \quad (1)$$

For each arc in a path, the head vertex of the arc must be the same as the tail vertex of the previous arc. This definition does not preclude a path containing one arc.

The path length $|P(x,y)|$ is the number of arcs within a path (n−1 in Eq. (1)). PASs may have cycles within them (P(v,v)), but they do not have self-cycles (i.e., an arc (v,v) directly connecting a vertex to itself). In cases where there is a local authentication event on v, it may be ensured that v exists within the PAS. PASs may also have multiple connected components, and as a result, they are not necessarily strongly connected. Thus P(x,y) and/or P(y,x) may be undefined.

The path distance d(y,x) is the shortest directed path length $|P(x,y)|$ from vertex x to vertex y. The diameter $D_u$ may be defined as the maximum distance d(•,•) between any two vertices within $G_u$:

$$D_u=\max d(x,y) \text{ such that } x,y\in V_u \wedge P_u(x,y)\neq \emptyset \quad (2)$$

Time constraints within path exploration may provide additional value to graph attributes. Time constraints are a form of graph constraint satisfaction within a PAS. To take advantage of time constraints, two time attributes may be defined that are assigned to every arc (x,y) within a PAS. $t_{first}$(x,y) is defined to be the first time the arc (x,y) was observed within the authentication data defining $G_u$. Similarly, the last time the arc (x,y) was observed within the authentication data defining $G_u$ is denoted $t_{last}$(x,y). When there is exactly one authentication event presented by an arc in the PAS, $t_{first}$(x,y)=$t_{last}$(x,y). Keeping two time attributes per arc instead of every time instance reduces memory usage for PASs where large numbers of authentication events may be represented by an arc.

By requiring time ordering along the arcs in a path, the number of paths requiring investigation can be reduced. As such, a time-constrained path may be defined from $v_1$ to $v_n$ in $G_u$ as:

$$\vec{P}_u(v_1,v_n)=((v_1,v_2), \ldots ,(v_{i-1},v_i),(v_i,v_{i+1}), \ldots ,(v_{n-1}, v_n))$$

such that $t_{last}(v_j,V_{j+1})\geq \max(t_{first}(v_1,v_2), \ldots ,t_{first}(v_j,v_{j+1}))$, where $(v_j,v_{j+1})\in A_u, j=1, \ldots ,n-1$ \quad (3)

Figure 5:
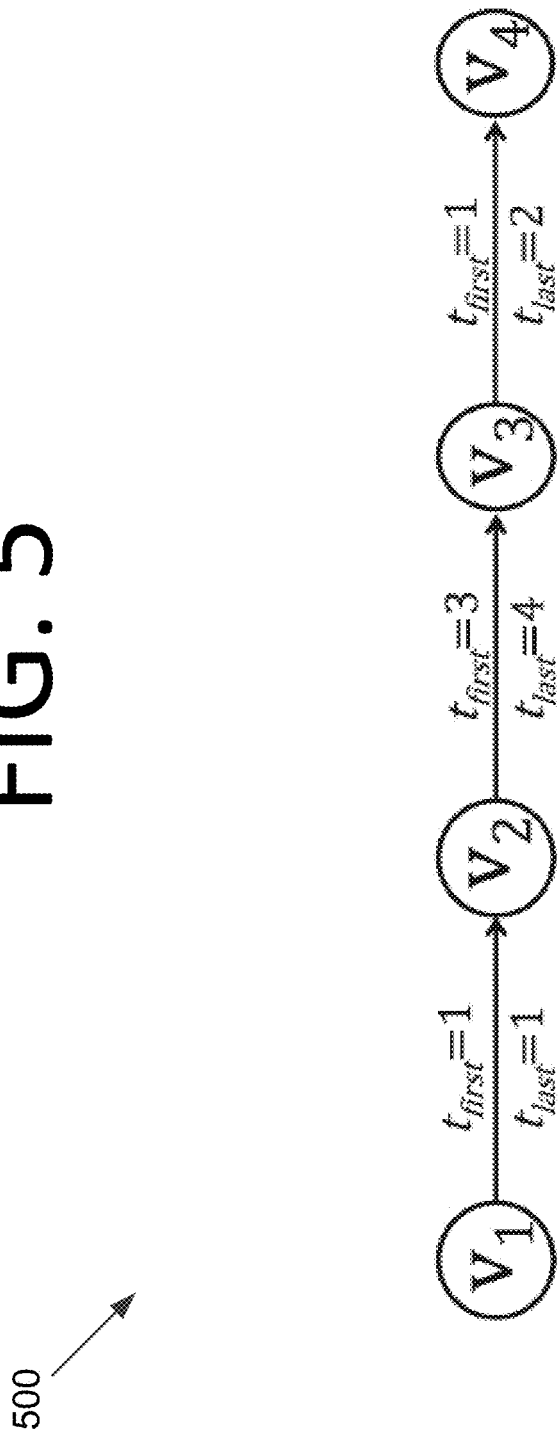
FIG. 5 is a graph illustrating the difference of a time-constrained path within a small example graph versus a longer, non-time-constrained path within the same graph, according to an embodiment of the present invention.

The constraint of $t_{last}$ following all preceding $t_{first}$ values within a path correctly reflects event time ordering that exists in a sequential set of authentication events. Graph 500 of FIG. 5 demonstrates the difference of a time-constrained path within a small example graph versus a longer, non-time-constrained path within the same graph.

A time-constrained path distance $\vec{d}$(x,y) is the shortest directed path length $\vec{P}$(x,y) from vertex x to vertex y using time-constrained arcs. A time-constrained diameter $\vec{D}_u$ is defined to be the maximum time-constrained distance d(•,•) between any two vertices within $G_u$:

$$\vec{D}_u=\max \vec{d}(x,y) \text{ such that } x,y\in V_u \wedge \vec{P}_u(x,y)\neq \emptyset \quad (4)$$

Figure 6:
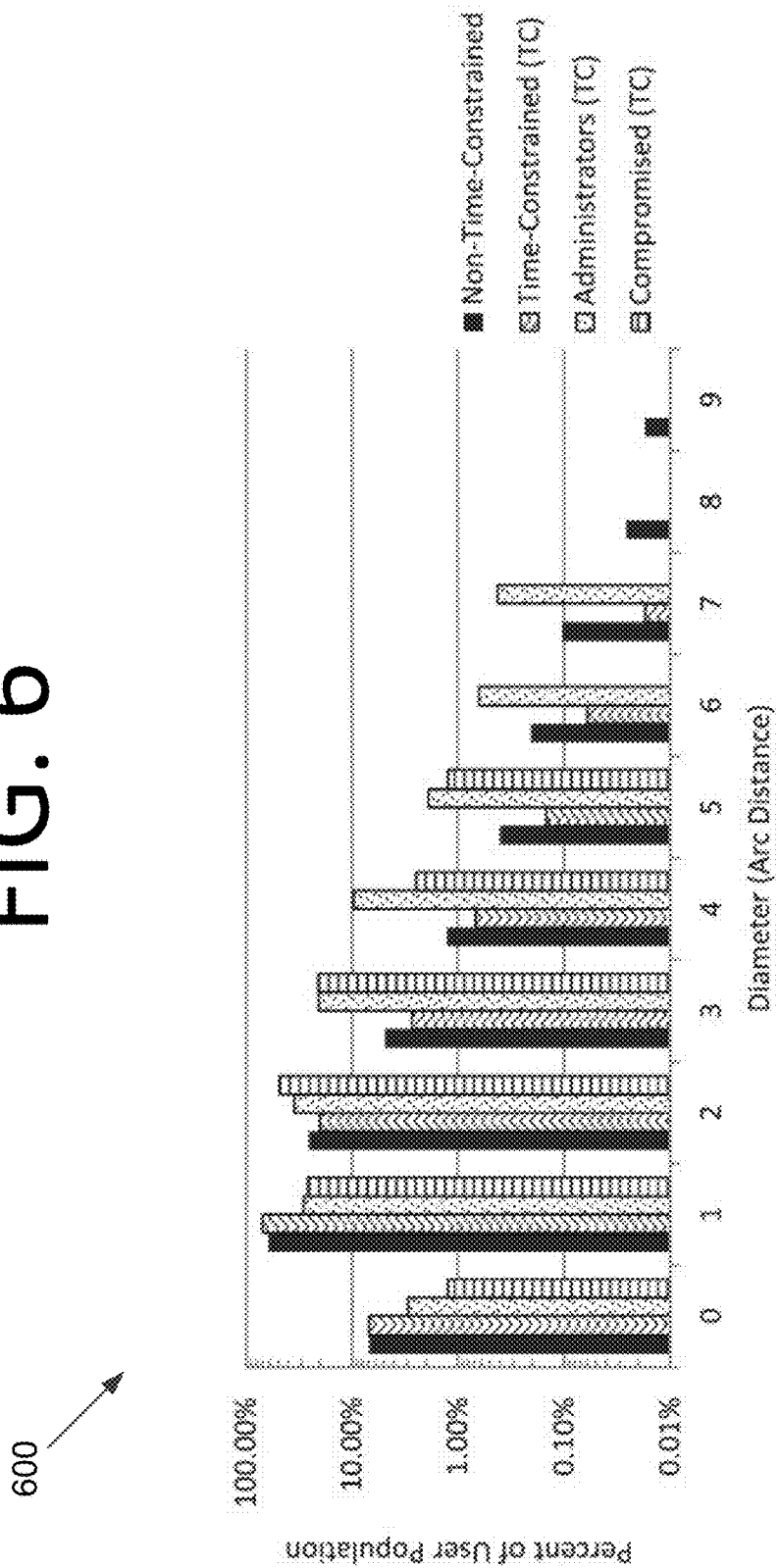
FIG. 6 is a histogram illustrating both traditional graph diameter (non-time-constrained) and time-constrained diameter for general users, administrative users, and users that were compromised, according to an embodiment of the present invention.
Figure 9:
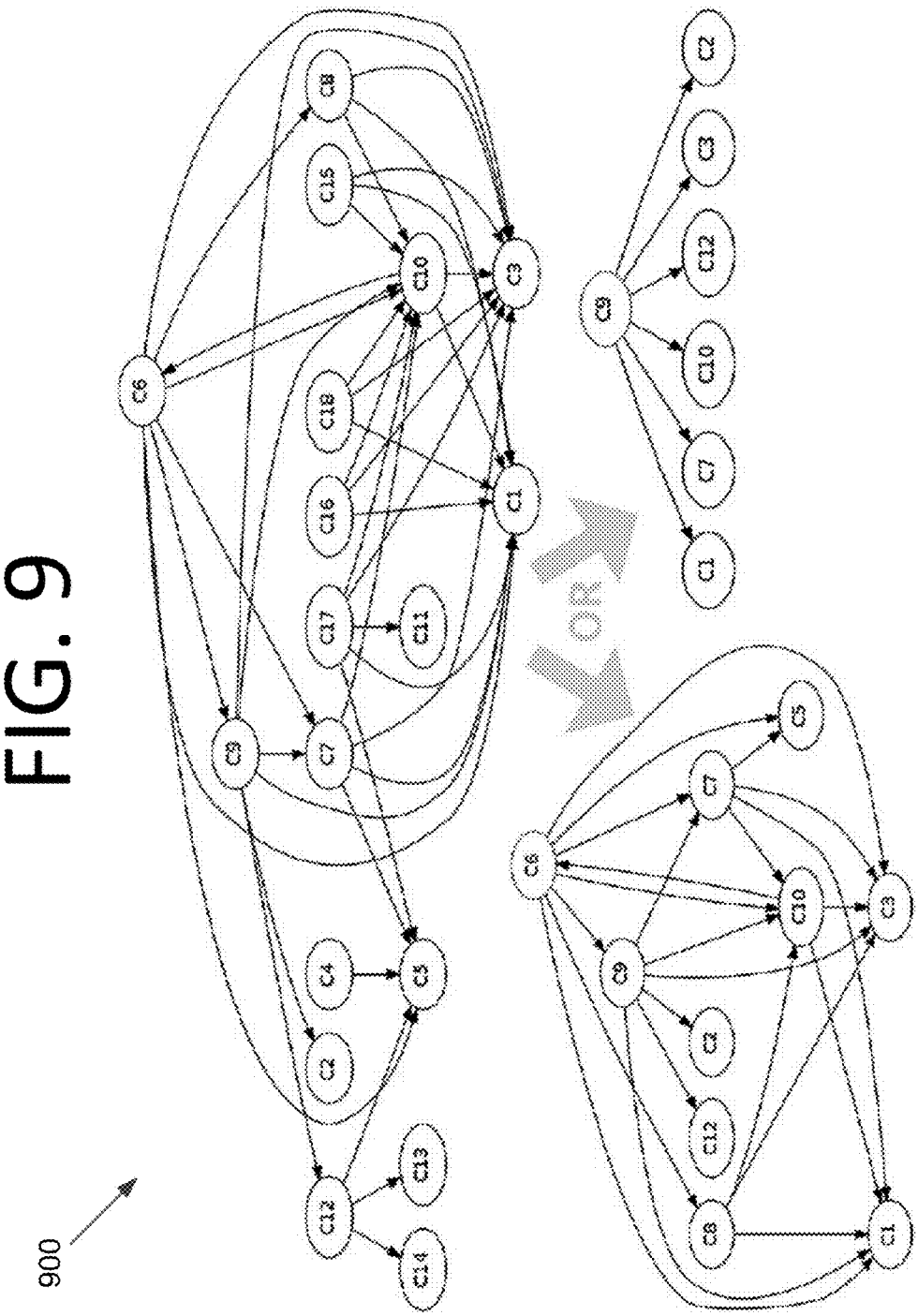
FIG. 9 is a graph illustrating the PAS $G_u$ from a typical user with administrative access showing how time constraints on paths $\vec{P}_u$ provide visualization simplification, according to an embodiment of the present invention.

The time-constrained diameter is generally lower than the non-time-constrained diameter of the same PAS, particularly for users that have high diameters within an authentication data set, as seen in histogram 600 of FIG. 6. It is possible for time-constrained diameters to be longer than the non-time-constrained diameter (e.g., the PAS in graph 1200 of FIG. 12), though such examples are rare. Note that there is one non-viable path and one viable path from vertex A to vertex D, and that vertex B is part of the exploration twice within the breadth first search. Time-constrained paths and diameter provide graph features that improve the detection of malicious activity and the ability to differentiate user types (see, for example, graphs 1300 and 1400 of FIGS. 13 and 14, respectively). Time-constrained paths also enable PAS simplification for visualization purposes, particularly for PASs that have a significant number of vertices and arcs. For example, graph 900 of FIG. 9 shows a more complex PAS that has been decomposed into two time-constrained subgraphs based on a different starting vertex in each case. This PAS is the same as shown in graph 400 of FIG. 4. However, the bottom two graphs show two simplified views using time-constrained paths originating from two different computers (vertices) C6 and C9. This simplification and visualization of the graphs with time enforcement help cyber intrusion investigators better understand how potential compromises have occurred through authentication credential attacks.

In addition to graph paths, the directed graph density is also considered to be an important attribute describing how well connected a PAS is. The directed graph density $\rho_u$ is defined as the ratio of arcs to potential arcs given the number of vertices as follows:

$$\rho_u = \frac{|A_u|}{|V_u|(|V_u|-1)} \qquad (5)$$

Figure 7:
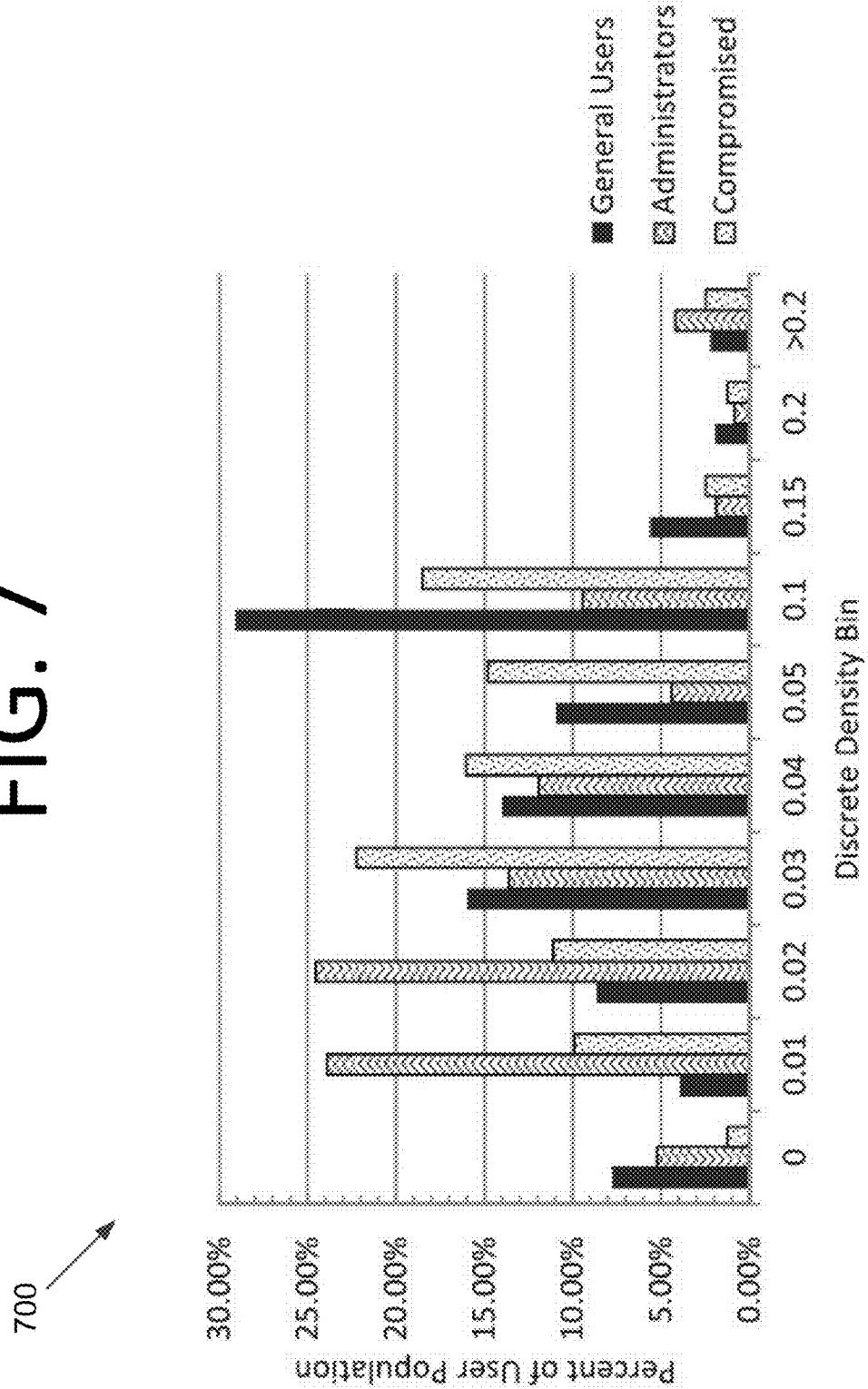
FIG. 7 is a histogram illustrating discretized directed graph density across administrative users, and users that were compromised, according to an embodiment of the present invention.

Graph 700 of FIG. 7 shows the distribution of graph density across the population of example PASs. While administrative users often have larger PASs, they generally have a lower density. The intuitive conclusion is that administrative users make elongated graphs, reducing density.

Figure 8:
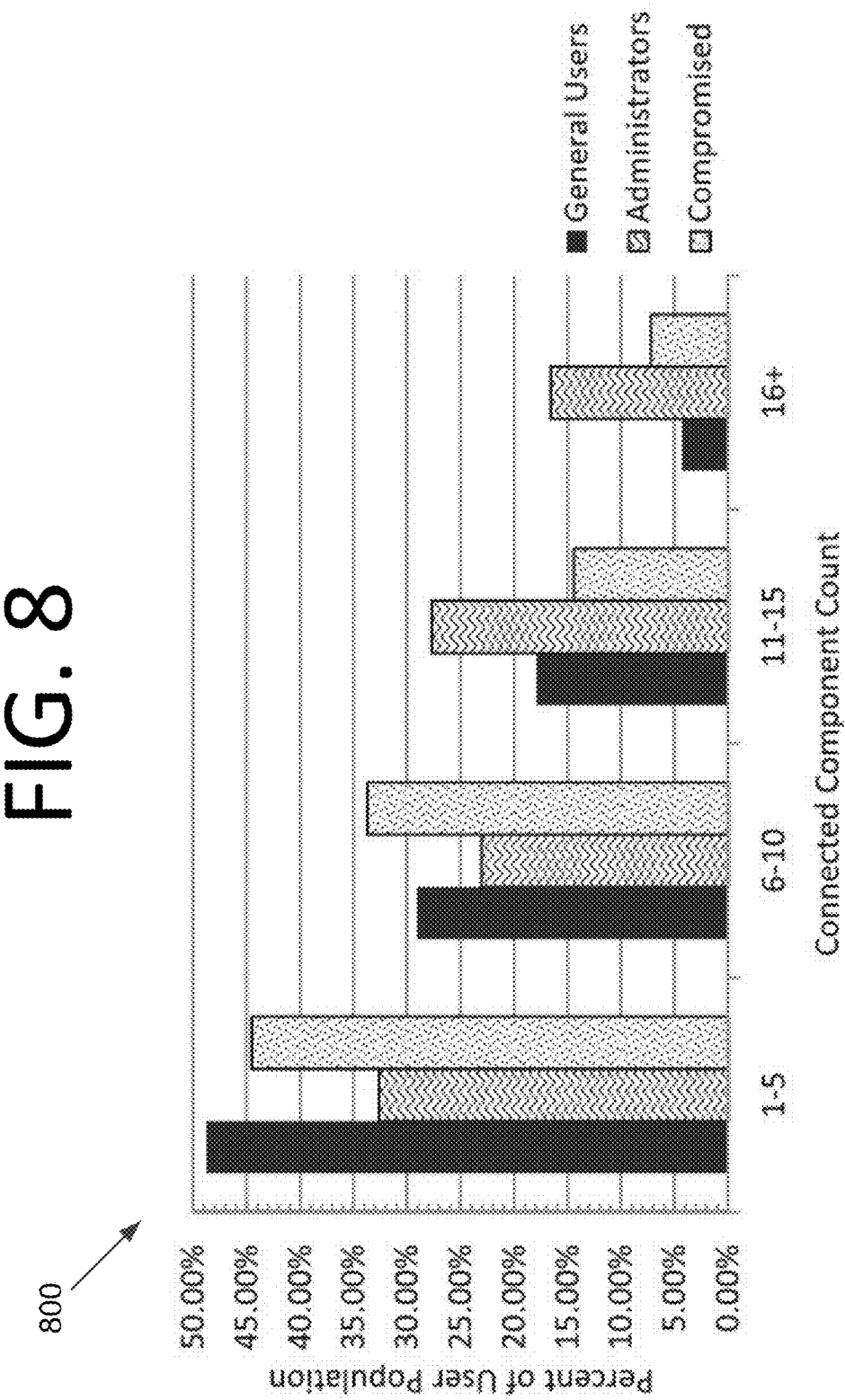
FIG. 8 is a graph illustrating the distribution of connected component counts $|C_u|$ for users' PASs within example, real world authentication data sets, according to an embodiment of the present invention.

The number of weakly connected subgraphs of $G_u$ that are not connected to each other is another relevant PAS attribute. A weakly connected subgraph is defined as a set of vertices where all associated arcs have directionality removed (becoming non-directional edges) such that there exists a non-directional path P(x,y) for all vertices x and y within the weakly connected subgraph. This set of weakly connected subgraphs or connected components within $G_u$ is referred to as $C_u$. Graph 800 of FIG. 8 shows the distribution of connected component counts $|C_u|$ for users' PASs within the example, real world data sets. The number of weakly connected subgraphs often corresponds well to the number of computers a user accesses (desktops, laptops, terminal servers, etc.).

Each vertex $v \in V_u$ has an indegree denoted $deg^-(v)$ representing the number of arcs that arrive at v (incoming authentication events to v) and an outdegree denoted $deg^+(v)$ representing the number of arcs that originate from v (outgoing authentication events from v). The remainder of definitions in this section are all relative to the vertices within a PAS.

The set of vertices $O_u$ are defined as outstars where each member vertex has an outdegree greater than 1 and the outdegree is greater than or equal to the indegree, such that:

$$O_u = \{v \in V_u | deg^+(v) > 1 \wedge deg^+(v) > deg^-(v)\} \qquad (6)$$

Generally, desktop computers and similar computers from which users originate activity are outstars. Similarly, the set of vertices $I_u$ is defined as instars where each member vertex has an indegree greater than one and the indegree is greater than the outdegree, such that:

$$I_u = \{v \in V_u | deg^-(v) > 1 \wedge deg^-(v) > deg^+(v)\} \qquad (7)$$

Network servers are generally classified as instars within a PAS.

Vertices that have both an indegree and an outdegree of zero (i.e., no associated arcs) are contained within the set of isolated vertices $Z_u$, such that:

$$Z_u = \{v \in V_u | deg^-(v) = 0 \wedge deg^+(v) = 0\} \qquad (8)$$

Isolated vertices are generally computers where local authentication activity occurs, but with no associated network authentication activity.

Returning to time constraints, the set of time-constrained transit vertices $\vec{T}_u$ is defined as where each member vertex v has at least one arc proceeding from a parent vertex and one arc succeeding to a child vertex. In addition, all of the arcs from proceeding parent vertices to v must have $t_{first}$ values that are before or at the same time as all of the $t_{last}$ values for arcs to succeeding child vertices from v:

$$\vec{T}_u = \{v \in V_u | deg^-(v) \geq 1 \wedge deg^+(v) \geq 1 \text{ such that } \forall x(x,v) \\ \in A_u \wedge \forall y(v,y) \in A_u, t_{first}(x,v) \leq t_{last}(v,y)\} \qquad (9)$$

Figure 10:
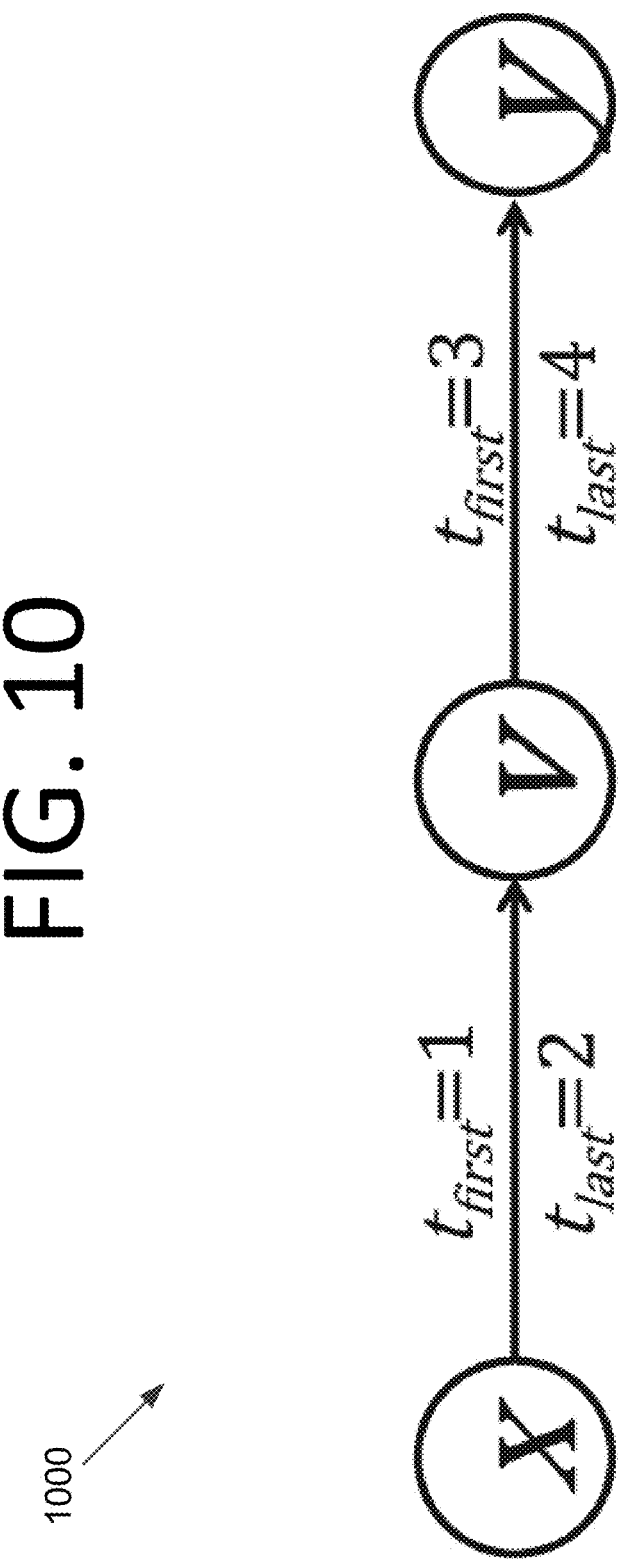
FIG. 10 is a graph illustrating a transit vertex v given $t_{first}(x,v) < t_{last}(v,y)$, according to an embodiment of the present invention.

FIG. 10 demonstrates a transit vertex within a small example graph 1000. Transit vertices are often associated with terminal servers or similar systems where users are authenticating first to and then from the computer.

Pseudo-leaf vertices account for the remainder of vertices that are not already contained in one of the previously defined outstar, instar, isolated, or transit vertex sets. A set of pseudo-leaf vertices $L_u$ is defined where both indegree and outdegree are 1 and 0, 0 and 1, or 1 and 1, respectively, such that:

$$L_u = \{v \in V_u | (deg^-(v) = 1 \wedge deg^+(v) \leq 1) \vee (deg^+(v) = 1 \wedge deg^-(v) \leq 1)\} \qquad (10)$$

Pseudo-leaf vertices within a PAS are generally incidental to its overall composition, but most often represent destination servers when indegree is one and outdegree is zero. The definition of a pseudo-leaf vertex is somewhat more generalized compared to the usual graph definition for a leaf vertex since it may have both indegree and outdegree. However, within the time-constrained definitions, these multi-degree pseudo-leaf vertices are similar to traditional leaf vertices within more specific time frames since they do not meet the previous definition as transit vertices.

Given the situation where a vertex could be a member of $O_u$, $I_u$, or $L_u$ as well as $\vec{T}_u$, the transit set membership is allowed to supersede the other sets, i.e., $O_u = \breve{O}_u - \breve{O}_u \cap \vec{T}_u$, etc., where $\breve{O}_u$ is the originally defined set without the overlapping $\vec{T}_u$ members removed. Thus, the vertex sets are set partitions of $V_u$ where:

$$V_u = O_u \cup I_u \cup L_u \cup Z_u \cup \vec{T}_u \qquad (11)$$

Figure 11:
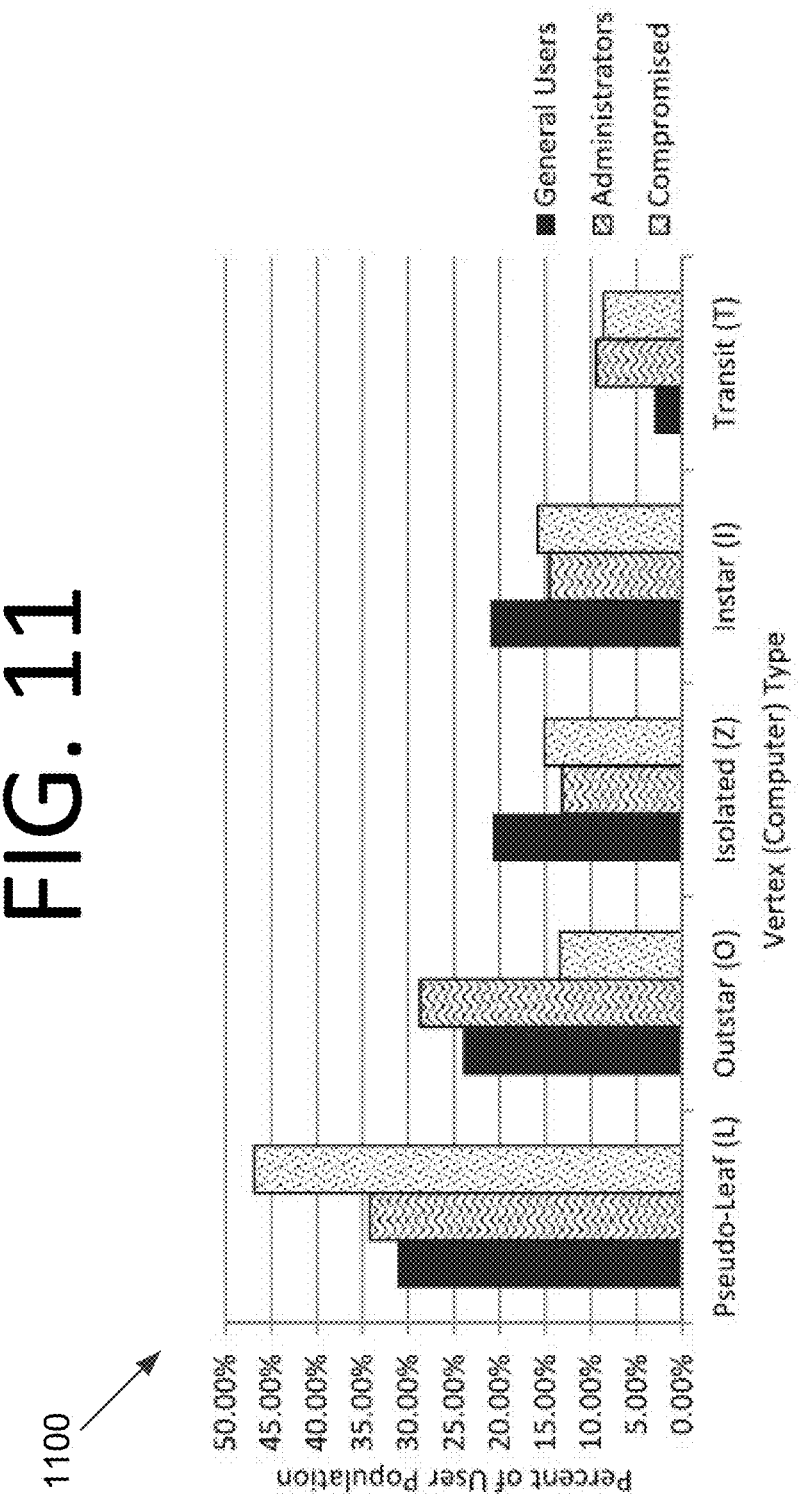
FIG. 11 is a histogram for all of the defined vertex types across general users, administrative users, and users that were compromised, according to an embodiment of the present invention.

The sets are disjoint with empty pairwise intersections. Graph 1100 of FIG. 11 shows the relative membership of vertices to these various sets as seen within the real world example data set.

Time-Constrained Path Distance Algorithm

Using the previous time-constrained definitions of $t_{first}(x,y)$ and $t_{last}(x,y)$, a modified arc-based breadth first search algorithm can be created to find a set of distances from a vertex to all other connected vertices. It is important to note that an arc-based search is much easier to implement than the more common vertex-based search. This is because, within the time-constrained search, vertices are potentially revisited due to differences in $t_{first}$ along a path, but arcs are not. The time-constrained distance algorithm is presented as two procedures.

The procedure TIMECONSTRAINEDDISTANCEVECTOR is the primary procedure and returns a list of tuples containing reachable vertices and the distance to each of these vertices from the starting vertex SrcV within the graph G. This procedure is defined as:

```
procedure TIMECONSTRAINEDDISTANCEVECTOR(G,SrcV)
    NextPass ← {(SrcV,Y),t_first(SrcV,Y)) ∀Y(SrcV,Y) ∈ Arcs(g)}
    Distance ← 0
    VisitedArcs ← Ø
    VertexDistances ← Ø
```

```
while |NextPass| > 0 do
    Distance ← Distance + 1
    ThisPass ← NextPass
    NextPass ← ∅
    for all ((U,V),Time) ∈ ThisPass do
        if (U,V) ∉ visitedArcs then
            VisitedArcs ← VisitedArcs ∪ {(U,V)}
            if VertexDistances[V] does not exist then
                VertexDistances[V] ← Distance
            end if
            NextPass ← NextPass ∪ ADDCHILDARGS(G,V,Time)
        end if
    end for
end while
return(VertexDistances)
end procedure
```

The NextPass list holds a list of arcs, each with an associated $t_{first}$. The Distance variable keeps track of the current arc distance being considered as the procedure's loop iterates. This outer loop continues as long as there are arcs in the list NextPass to consider, just as a traditional breadth first search algorithm would work. The loop copies NextPass into a new list ThisPass and then iterates within a nested loop over all arcs within the ThisPass list, allowing NextPass to be re-initialized for updating. Each iterated arc, if it has not been seen before, is added to the list of seen arcs, and the distance is added for the associated non-visited destination vertex. Finally, NextPass is updated with a new list of outgoing (child) arcs to explore, which are viable given the time-constraint requirements using the ADDCHILDARCS procedure below:

```
procedure ADDCHILDARCS(G,V,Time)
    NextTime ← Time
    NextArcSet ← ∅
    ChildArcs ← {∀U(V,U) ∉ Arcs(G)}
    for all Child ∈ ChildArcs do
        if Time ≤ t_last(Child) then
            if NextTime ≤ t_first(Child) then
                NextTime ← t_first(Child)
            end if
            NextArcSet ← NextArcSet ∪ {(Child, NextTime)}
        end if
    end for
    return(VertexDistances)
end procedure
```

Figure 12:
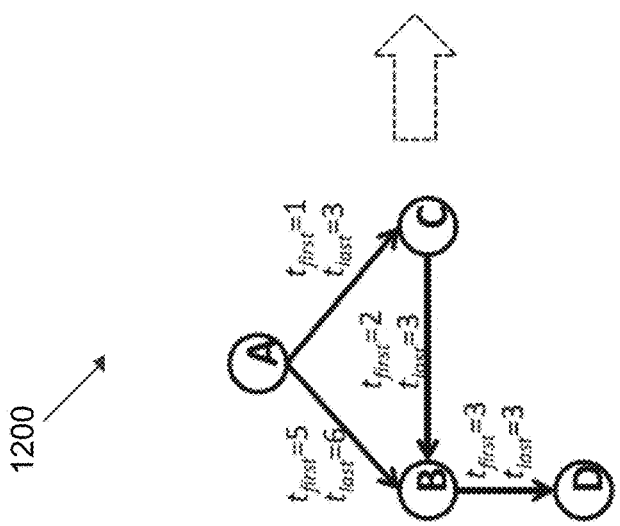
FIG. 12 illustrates a graph and the resulting steps and variables as the time-constrained distance algorithm TIME-CONSTRAINEDDISTANCEVECTOR is on run on the graph starting at vertex A.

The execution steps with the state of the primary variables of this time-constrained breadth first search are shown in graph 1200 of FIG. 12.

A traditional breadth first search for path exploration has complexity $\Theta(|V|+|A|)$ and enables graph diameter computation in $\Theta(|V| \times (|V|+|A|))$. The time-constrained version, searching arcs instead of vertices, has the same complexity. However, in practice, since PASs are generally sparse (as shown in graph 700 of FIG. 7), and because many potential paths are not time compliant, the time-constrained breadth first search is faster than the traditional algorithm. The differences in actual runtime as compared to potential run-time complexity are shown in Table 2 below.

TABLE 2

RECORDED RUNTIME COMPLEXITY RATIOS

| Ratio: | Traditional: | Non-Time-Constrained (Diameter D): | Time-Constrained (Diameter $\vec{D}$): |
|---|---|---|---|
| D Maximum | 41.4 | 3.0 | 1.0 |
| $\vec{D}$ Maximum | 92.8 | 0.67 | 0.47 |
| D Minimum | 1.0 | 0.0012 | 0.00079 |
| $\vec{D}$ Minimum | 0.013 | 0.0012 | 0.00011 |
| D Median | 1.0 | 0.080 | 0.042 |
| $\vec{D}$ Median | 0.57 | 0.044 | 0.022 |
| D Mean | 1.17 | 0.15 | 0.059 |
| $\vec{D}$ Mean | 0.70 | 0.062 | 0.029 |
| D Std. Deviation | 0.96 | 0.23 | 0.063 |
| $\vec{D}$ Std. Deviation | 1.26 | 0.064 | 0.025 |

The recorded run-time complexity ratios of actual over potential runtime complexity were calculated using 10,794 year-long PASs. Table 2 demonstrates the differences between traditional, non-time-enforcing diameter D and a time-constrained diameter $\vec{D}$. In average cases, the time-constrained diameter algorithm has an approximate complexity of $\Theta(|V|+|A|)/2$ and is generally half the operational complexity of the non-time-enforcing diameter calculation. However, in the few instances where a PAS has multiple cycles, time-constrained diameter becomes more expensive. The PASs used for complexity analysis had at least one arc within the graph, thus explaining the smaller number of 10,794 compared with overall example data set's 11,593 users.

One noteworthy exception is seen in the time-enforcing maximum in relation to $|V|+|A|$, which is due to a few complex PASs. The most significant PAS in the example data set, with a $|V|+|A|$ ratio of 92.8, had 338 vertices, 2610 arcs, multiple cycles, 5958 crossing subpaths, and required 273,620 iterations to calculate $\vec{D}_u$. This is an example of a very rare and complex PAS.

Application

Statistical models are used for the purpose of building baselines of PAS attribute data to use for the detection of deviations in an online system, as well as for static characterizations of user behavior. In some embodiments, logistic regression is used to baseline each individual attribute used within the model. Graph attributes were included within the models discussed below only if they had a p-value of 0.01 or less, indicating high significance within the model. Though logistic regression was a valuable method for research evaluation, more robust methods, including random forests (Breiman) or support vector machines (Hsu et al.), may provide improved results and are an area of future work in consideration for an operational system. See L. Breiman, "Random Forests," Mach. Learn. 45(1):5-32 (2001); see also C. W. Hsu and C. J. Lin, "A Comparison of Methods for Multiclass Support Vector Machines," IEEE Transactions on Neural Networks, 13(2):415-25 (2002).

User Type Profiling

The differences between PAS attributes are a valuable differentiator of certain user classifications within an enterprise network. More specifically, the attributes can differentiate users who have privileged administrative access to computers versus those who do not. Identifying users that have administrative access can be challenging in large enterprise environments that often do not centrally manage or track such access. As was seen in the various attribute distributions discussed previously, administrative users usually have more complex PASs when compared with general users. Graph 400 of FIG. 4 shows a common administrative user seen within the example one-year data set, while graph 200 of FIG. 2 shows a much simpler general user.

In addition to the PAS attributes defined above, three more attributes are defined using histograms over various attributes of the PAS. First is an indegree histogram where each discrete value of indegree count from the PAS is a bin in the histogram. The second is based on the histogram of time-constrained path lengths. The final attribute is based on the histogram of vertex types within a PAS. To represent the distributional aspects of these histograms in a singular value, Shannon entropy was used, defined as $\Sigma p \log(p)$, where p is the relative frequency of each histogram bin. This entropy value is a convenient single-valued summary of the histogram distribution.

Analysis shows that the following PAS attributes provide significant value in separating general users from administrative users (by having a p-value of 0.01 or less). This was determined by a logistic regression classifier using the previously discussed general user and administrative user labels over the example one-year data set:

$|V_u|$: vertex (computer) count;
$|A_u|$: arc count (authentications from one computer to another);
$\rho_u$: graph density;
$\vec{D}_u$: time-constrained diameter;
$|C_u|$: connected component count; and
$S_u$: the entropy of the histogram of the indegrees of the PAS vertices.

Let X be the random variable defined by:

$$X = \begin{cases} 0 & \text{if } u \text{ is not an administrator} \\ 1 & \text{if } u \text{ is an administrator} \end{cases}$$

A logistic regression can be defined using the set of attributes as:

$$\text{Model 1: } \log\left(\frac{P(X=1)}{P(X=0)}\right) = \quad (12)$$

$$\beta_0 + \beta_1|V_u| + \beta_2|A_u| + \beta_3\rho_u + \beta_4\vec{D}_u + \beta_5|C_u| + \beta_6 S_u$$

For comparison purposes, Model 2 is defined without time-constrained attributes, in which only vertex and arc counts are significant (p-value of 0.01 or less):

$$\text{Model 2: } \log\left(\frac{P(X=1)}{P(X=0)}\right) = \beta_0 + \beta_1|V_u| + \beta_2|A_u| \quad (13)$$

Similarly, Model 3 is defined as a simple base model with only PAS connected component count:

$$\text{Model 3: } \log\left(\frac{P(X=1)}{P(X=0)}\right) = \beta_0 + \beta_1|C_u| \quad (14)$$

The resulting logistic regression classifiers show good results in differentiating the two user types. The attributes that were most significant in the models match the assumptions. As expected, graph size and complexity as represented by vertex and arc counts, density, and diameter are strongly represented within the model results.

Figure 13:
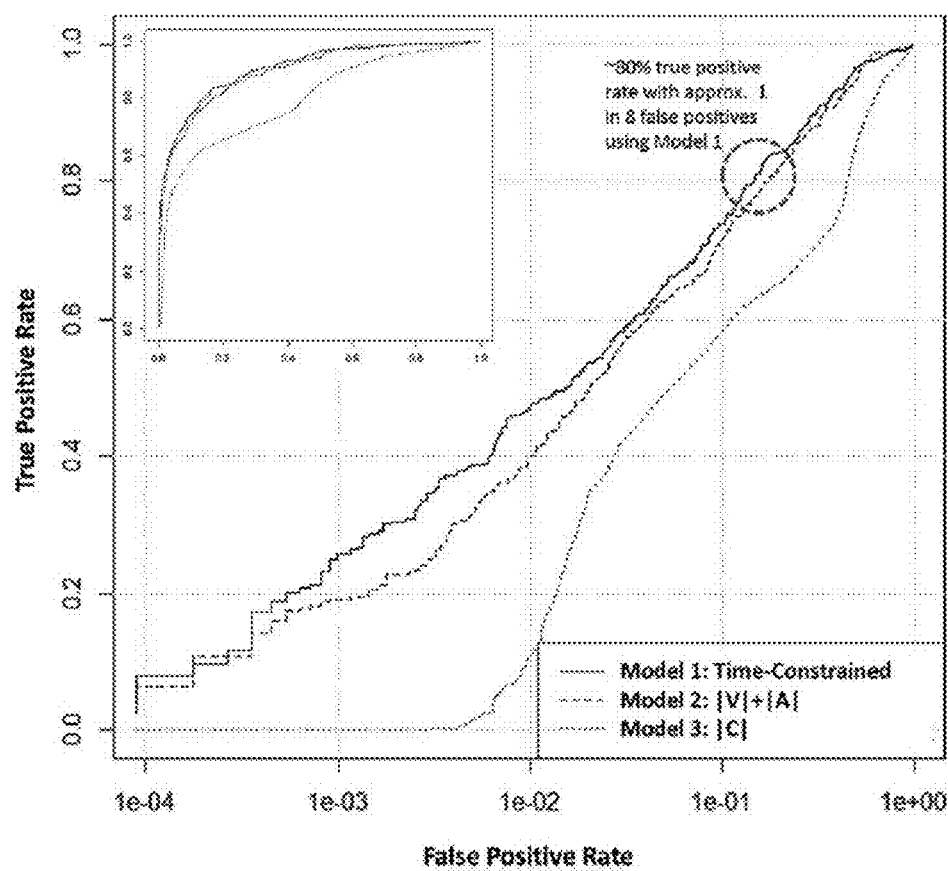
FIG. 13 is a graph illustrating Receiver Operating Characteristic (ROC) curves comparing logistic regression classifiers for differentiating administrative user-based and general user-based PAS feature sets, according to an embodiment of the present invention.

As seen in graph 1300 of FIG. 13, a system administrator can be predicted approximately 80% of time with approximately a 1-in-8 false positive rate with the Model 1 feature set. The Receiver Operating Characteristic (ROC) curve also shows the two other models result in less accuracy. See A. P. Bradley, "The Use of the Area under the ROC Curve in the Evaluation of Machine Learning Algorithms," Pattern Recognition 30(7):1145-59 (1997). To assist in validating our models, 10-fold cross validation was used to generate the average ROC curves. More specifically, the data was randomly divided into ten equal subsets where one subset was used as validation against the other nine. The resulting ROC curve is the average across the non-validating nine subsets of the data in comparison to the tenth validation subset. Additional details of k-fold validation can be found in R. Kohavi, "A Study of Cross-Validation and Bootstrap for Accuracy Estimation and Model Selection, Proceedings of the International Joint Conference on Artificial Intelligence, vol. 14, p.p. 1137-45 (1995).

Table 3 shows the details of the logistic regression classifiers for all three models including coefficients and their significance.

TABLE 3

| LOGICAL REGRESSION CLASSIFIER DETAILS | | | |
|---|---|---|---|
| $\beta$: | Model 1: | Model 2: | Model 3: |
| $|V_u|$ | 0.035*** | 0.030*** | Not Used |
|  | (0.004) | (0.002) |  |
| $|A_u|$ | −0.003*** | 0.002*** | Not Used |
|  | (0.001) | (0.001) |  |
| $|\rho_u|$ | −23.357*** | Not Used | Not Used |
|  | (3.289) |  |  |
| $\vec{D}_u$ | 0.424*** | Not Used | Not Used |
|  | (0.084) |  |  |
| $|C_u|$ | −0.015 | Not Used | 0.035*** |
|  | (0.006) |  | (0.0003) |
| $S_u$ | 1.486*** | Not Used | Not Used |
|  | (0.167) |  |  |
| Constant | −6.898*** | −4.936*** | −3.653*** |
|  | (0.337) | (0.096) | (0.060) |

***p < 0.01

Note again that every coefficient used is statistically significant at the 0.01 level or better, thus reduced models such as Model 2 and Model 3 do not fit as well. However, Model 2 and Model 3 are presented as simpler models for both comparison and possible circumstances where fewer graph attributes are available due to constrained computation or other limitations.

Of particular interest are the few outlying users with large and complex graphs who are not administrators and are responsible for most of the false positives within the model. These users may simply be defined as "power users" or administrators that were missed in the classification method. While unlikely, inappropriate behavior may also be exhibited by some of these users, or by someone else misusing their tickets/credentials. These users require further investigation and research. One of the advantages to the use of PAS attributes is that it can help focus limited analyst time on users whose activity requires further investigation.

The analysis of why administrators have more complex and extensive graphs is ongoing, but some likely reasons can be hypothesized. For example, because administrators often manage a large number of computers, they are likely to log into many or all of those computers as a function of their job.

They also rely on various network computers, like central patch servers or application install servers, that increase their authentication graph diameter and maximum indegree.

Other user differentiation may be possible through PAS characteristics. For example, PAS attributes were used to differentiate general users, administrators, and a subset of "core" institutional administrators by Kent and Liebrock, though without the use of time-constrained attributes. See A. D. Kent and L. M. Liebrock, "Differentiating User Authentication Graphs," $2^{nd}$ Annual IEEE CS Security and Privacy Workshop on Research of Insider Threat WRIT (2013). In comparison, the computationally less expensive time-constrained attributes used herein generated comparable or slightly better differentiation results. In addition, the example data set used in the previous work was from a different, non-overlapping time period.

Detection of Compromise

PASs may be used to detect network compromises that involve inappropriate use of a user's authentication credentials. There is a set of graph attributes that differentiate what most normal users do as a function of their authentication activity from what a malicious entity would do with the same credentials, at least in the studied example, real world data set.

As a basis for validation, a complete set of data surrounding a red team exercise that spanned a one-month time period was used, as presented above. The exercise simulated a malicious attack where a set of users were spear phished via email and a small number had their user accounts compromised, including their associated authentication credentials. Spear phishing is a malicious social engineering exploit where a user is convinced by the contents of an email to take some action that allows the malicious actor to take control of that user's computer environment and associated account. The red team then was able to expand its presence within the network through lateral credential exploitation and credential theft, gaining access to 81 different users' authentication credentials across many more computers within the network. See C. Hummel, "Why Crack when You Can Pass the Hash?" SANS Institute InfoSec Reading Room (2009). These 81 users were labeled as compromised for the purposes of differentiating them from the much larger population of non-compromised users. It is worth noting that 40 of these compromised users were also labeled as administrators, as discussed above, showing the value of targeting administrator-level credentials by the red team.

Similar to the approach with administrative users and general users, a statistical model classifier was used to determine that the following set of PAS attributes provide value in separating compromised users from non-compromised users by having a p-value of 0.01 or less:

$|V_u|$: vertex (computer) count;

$|A_u|$: arc count (authentications from one computer to another);

$\rho_u$: PAS density;

$\vec{D}_u$: time-constrained diameter;

$S_{u\vec{P}}$: the entropy of the histogram of the PAS time-constrained path lengths; and $S_{uVT}$: the entropy of the histogram of vertex types ($I_u$, $O_u$, $L_u$, $Z_u$, $\vec{T}_u$) within the PAS.

Let X be the random variable defined by:

$$X = \begin{cases} 0 & \text{if } u \text{ is not compromised} \\ 1 & \text{if } u \text{ is compromised} \end{cases}$$

The logistic regression for the full model, Model 1, using all of the relevant, statistically significant attributes is:

$$\text{Model 1: } \log\left(\frac{P(X=1)}{P(X=0)}\right) = \qquad (15)$$

$$\beta_0 + \beta_1|V_u| + \beta_2|A_u| + \beta_3\rho_u + \beta_4\vec{D}_u + \beta_5|S_{u\vec{P}}| + \beta_6 S_{uVT}$$

For comparison purposes, Model 2 is defined using non-time-constrained, yet still statistically significant attributes:

$$\text{Model 2: } \log\left(\frac{P(X=1)}{P(X=0)}\right) = \beta_0 + \beta_1\rho_u + \beta_2 D_u + \beta_3 S_{u\vec{P}} \qquad (16)$$

Similarly, Model 3 is defined using only the non-time-constrained diameter:

$$\text{Model 3: } \log\left(\frac{P(X=1)}{P(X=0)}\right) = \beta_0 + \beta_1 D_u \qquad (17)$$

Finally, Model 4 is defined with just the graph density as a basis for comparison:

$$\text{Model 4: } \log\left(\frac{P(X=1)}{P(X=0)}\right) = \beta_0 + \beta_1\rho_u \qquad (18)$$

The resulting classifiers show a useful ability to detect the difference between compromised and non-compromised users. Similar to user type differentiation, the attributes that were most significant in the models match the assumptions. As expected, graph size and complexity as reflected in the graph attributes are different between compromised and non-compromised users. For example, graph diameter and connected components often increase when users become compromised.

Figure 14:
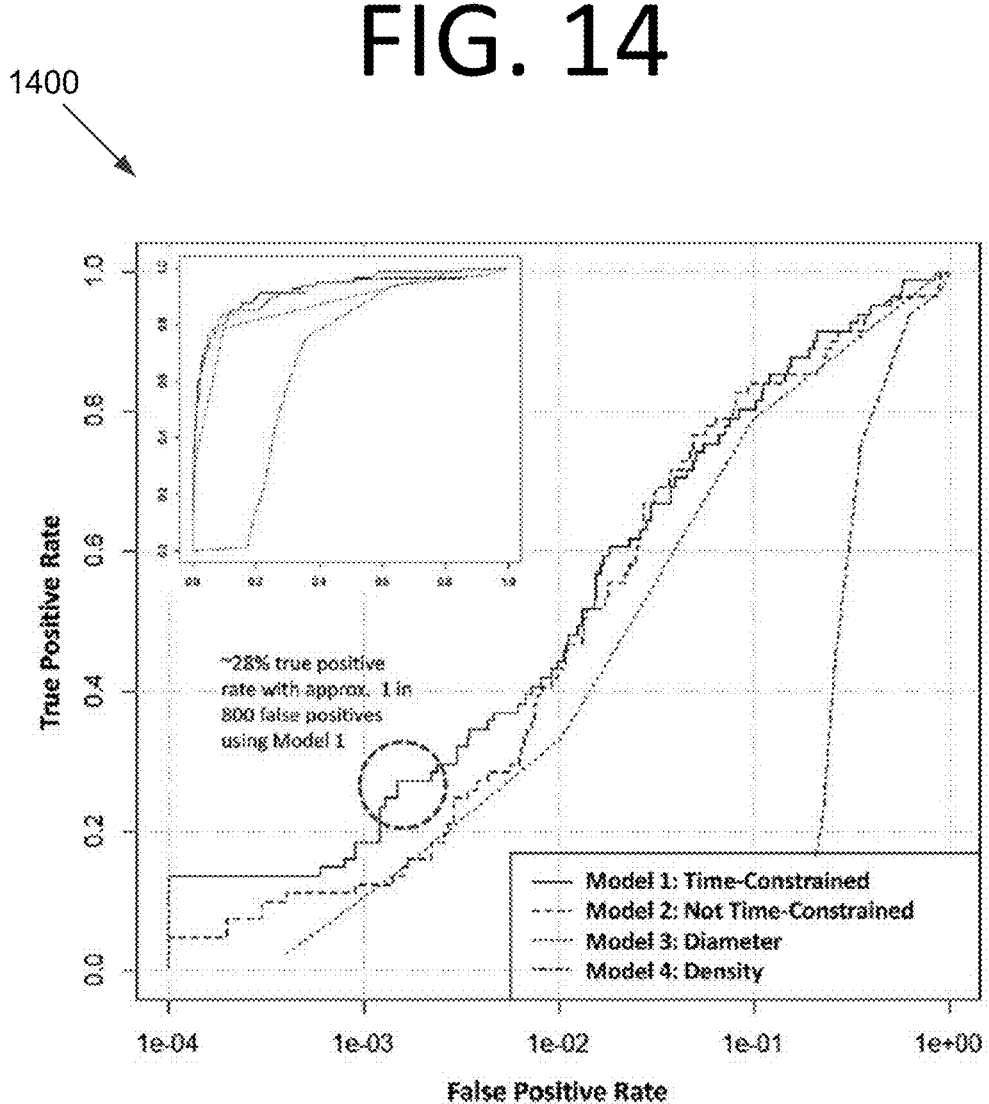
FIG. 14 is a graph illustrating averaged ROC curves comparing logistic regression classifiers for detecting compromised users, according to an embodiment of the present invention.

As seen in graph 1400 of FIG. 14, Logistic regression Model 1 was used to successfully detect a compromise approximately 28% of the time with only a 1-in-800 false positive rate. This particularly low false positive rate is very important given a user population size of approximately 12,000, where security analysts are required to examine all compromise indicators, true or false. FIG. 14 also shows three other models that result in less accuracy and include the use of non-time-constrained attributes. Again, 10-fold cross validation was used to generate the average ROC curves. Table 4 below shows the logistic regression classifier fits for all four models, including coefficients and their variable significance.

TABLE 4

| LOGISTIC REGRESSION CLASSIFIER DETAILS | | | | |
|---|---|---|---|---|
| β: | Model 1: | Model 2: | Model 3: | Model 4: |
| $|V_u|$ | 0.071*** (0.015) | Not Used | Not Used | Not Used |
| $|A_u|$ | −0.019*** (0.006) | Not Used | Not Used | Not Used |
| $\rho_u$ | −10.210*** (3.519) | −20.843*** (3.120) | Not Used | −10.161*** (1.861) |
| $\vec{D}_u$ | 1.113*** (0.187) | Not Used | Not Used | Not Used |

TABLE 4-continued

LOGISTIC REGRESSION CLASSIFIER DETAILS

| β: | Model 1: | Model 2: | Model 3: | Model 4: |
|---|---|---|---|---|
| $D_u$ | Not Used | 1.194*** (0.160) | 1.902*** (0.121) | Not Used |
| $S_u\vec{P}$ | 2.101*** (0.451) | Not Used | Not Used | Not Used |
| $S_{uP}$ | Not Used | 1.528*** (0.262) | Not Used | Not Used |
| $S_{uVT}$ | −3.264*** (1.263) | Not Used | Not Used | Not Used |
| Constant | −7.914*** (0.513) | −6.608*** (0.348) | −7.495*** (0.264) | −4.052*** (0.150) |

***$p < 0.01$

Although a 28% detection rate seems low in comparison to many existing techniques for detecting traditional compromise events, the ability to detect actual credential theft and resultant credential hopping is novel and difficult to compare with other intrusion detection techniques that look for more well-defined compromise indicators. Since most relevant, real-world attacks compromise multiple credentials, detecting any one stolen credential is sufficient to detect the overall attack. Thus, it is assumed that individual credential attacks are statistically independent and have the same probability p of detection, then the probability of detecting the overall attack is $1-((1-p)^n)$, where n is the number of individual detections. In the red team example, with p=0.28 and n=81, the overall detection probability is 100% to eleven decimal places. In a more realistic phishing email attack with lateral network movement using stolen credentials, where the attacker compromises only 8 different user credentials, a 93% detection rate would be realized for the overall attack.

Statistical model classifiers, including logistic regression, show that there are distinguishing attribute combinations that differentiate compromised PASs from non-compromised PASs. The use of baseline statistical models also offers the advantages of both computational simplicity in detection and interpretability of the parameter fits. Future opportunities may exist to refine a classifier through the use of more descriptive graph attributes that are yet to be determined, as well as other classification approaches beyond logistic regression. Another key need for a realistic detector is to consider the data as a continuous time series of activity.

Detection Through Time Series Analysis

Most cyber security data sets, including the example authentication data sets discussed herein, are sequences of time series events. Representing these events as graphs provides relational insights and feature extraction opportunities, but also leads to a loss of dynamic time characteristics that may be present in the data. As a result, there is a need to consider PASs in terms of a time series of dynamic activity. The time-constrained features discussed above are one aspect of meeting this need, but they do not fully account for continuous time dynamics.

The primary approach herein with dynamic time series graph analysis has been to create PASs over sliding time windows of authentication events. Two-hour time windows, sliding by 30 minutes, provide a minimum window length. Shorter time periods result in PASs that are too sparse.

Figure 15:
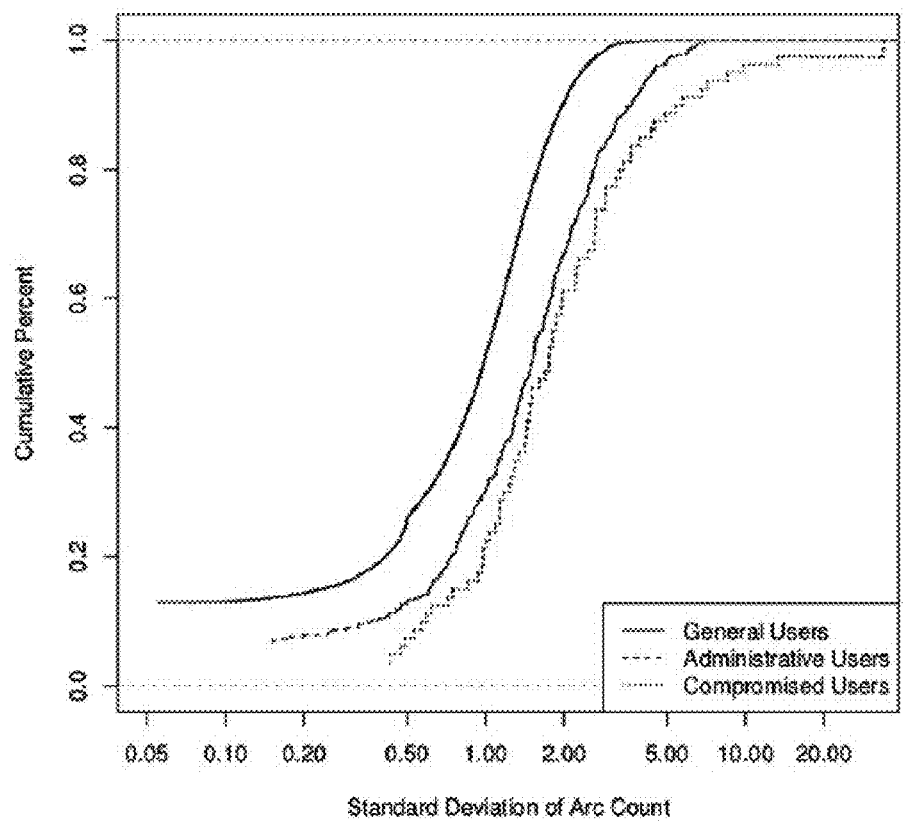
FIG. 15 is a graph illustrating cumulative distribution functions showing the differences in the standard deviation of PAS arc count over a two-hour window time series of example data labeled as general users, administrative users, and compromised users, according to an embodiment of the present invention.

The exploration into comparing PASs in these moving time windows has yielded interesting preliminary results. For example, administrative users have bimodal behavior. In some time periods, their PASs reflect that of a general user, and in other time periods, they have the more complicated graph one would expect to see from administrative users. This may be explained by the fact that administrative users sometimes have the behavior of general users. This differentiation can be seen in graph 1500 of FIG. 15, where there is an overall increased separation between the standard deviation of arc counts in administrative users in comparison to general users. This difference represents the variability increase observed in administrative users. It has been found that compromised users have even more variability.

Figure 16:
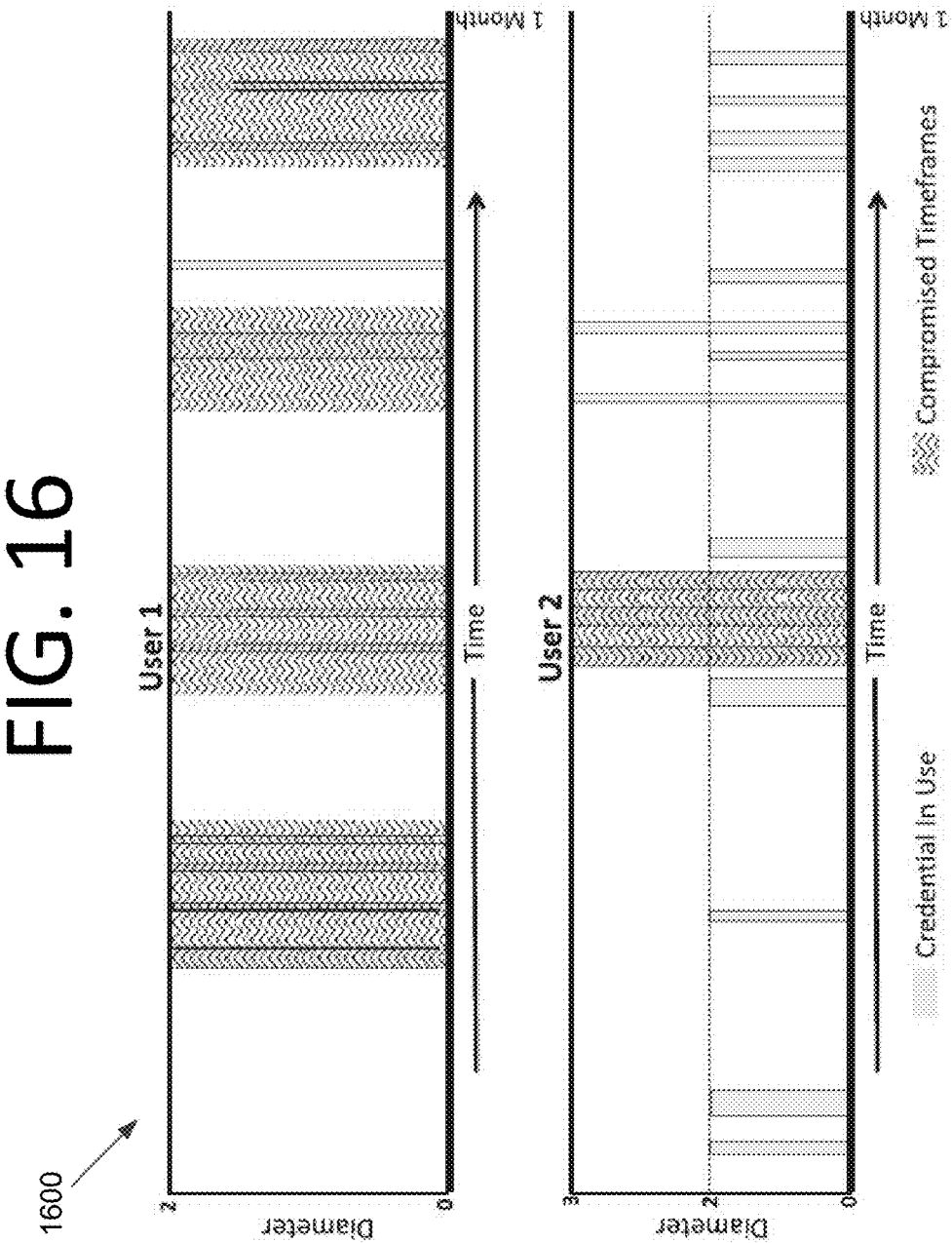
FIG. 16 is a pair of graphs illustrating the time-constrained diameter $\vec{D}_u$ of two users who were compromised using two hour windows in a time series over the example one-month data set, according to an embodiment of the present invention.

Time series analysis over PASs also makes sense for intrusion detection. To this end, there are key features that effectively detect compromise events within time series PASs, at least in some cases. Graph 1600 of FIG. 16 shows a time series of $\vec{D}_u$ for two different users. While the ability to detect the compromise activity is present using just the diameter attribute, there are significant false positives with this simplified approach. Using more integrated feature sets across the time series generated PASs, in combination with more nuanced comparison techniques, enables better approaches for determining inappropriate use of authentication credentials. User models, normalized to their past behavior, should yield improved detection quality. For example, an exponentially weighted moving average on the diameter, combined with a secondary cumulative sum (CUSUM) of the diameters' p-values, would detect both short-term and longer-term anomaly events over time. See G. A. Barnard, "Control Charts and Stochastic Processes," Journal of the Royal Statistical Society, Series B (Methodological), Vol. XXI, No. 2, p.p. 239-71 (1959). The CUSUM is a method borrowed from the control chart literature for handling both acute, single point anomalies, along with moderate anomalies that occur over the recent past. It is a lightweight, easily updated method for accounting for dependent anomalous data over time. This approach may provide a computationally feasible, real-time detection capability based on the work from Lambert and Liu. See D. Lambert and C. Liu, "Adaptive Thresholds: Monitoring Streams of Network Counts," Journal of the American Statistical Association 101(473):78-88 (2006).

Continuously updating PASs that add and remove vertices and arcs and enable real-time analysis through a dynamic process may also be explored. This would improve upon the current time window approach and potentially increase the fidelity and usefulness of time-constrained aspects of PASs.

Bipartite Authentication Graphs

In addition to PASs, authentication data may also be used to generate a bipartite graph where the graph vertices are the two disjoint sets of users and computers. This bipartite graph then associates the user and computer sets with edges representing authentication events. More specifically, a bipartite authentication graph (BAG) can be defined for all user authentication activity in an enterprise network as B=(U, V, E), where U is a set of vertices that represent users authenticating in the network, V is a set of vertices that represent computers that users are authenticating to, and E represents a set of undirected edges that associates users from U authenticating to (or on) a computer in V over some time period. This creates an affiliation network between users and computers on the basis of authentication activity. This representation allows exploration of the relationship and significance of credentials and their use over communities of computers and users. This representation may also open a variety of research opportunities relating to social network affiliation analysis and how people use computer networks.

In some embodiments, the bipartite graph representation is used as an effective method to examine potential risk of credential stealing and compromise within the enterprise network. Since this bipartite graph captures the entire user population and its relationships through computers, there is the potential to identify credential theft and hopping, which is unavailable in the previously discussed PAS analysis. A key question is what user or computer represents the most risk of compromise within the network. In simple form, this can be asked by considering the vertex with the highest degree. A more exact approach would be to find the vertex that, if removed, increases the connected component count the most for the overall BAG. In most cases, these two measures result in the same vertex selection. An increase in the connected component count potentially makes it more difficult for a malicious actor to steal and reuse credentials to move through a network. An increase in connected component count within a network can be equated to a reduction in the risk associated with credential theft and subsequent credential hopping within the network.

Figure 17:
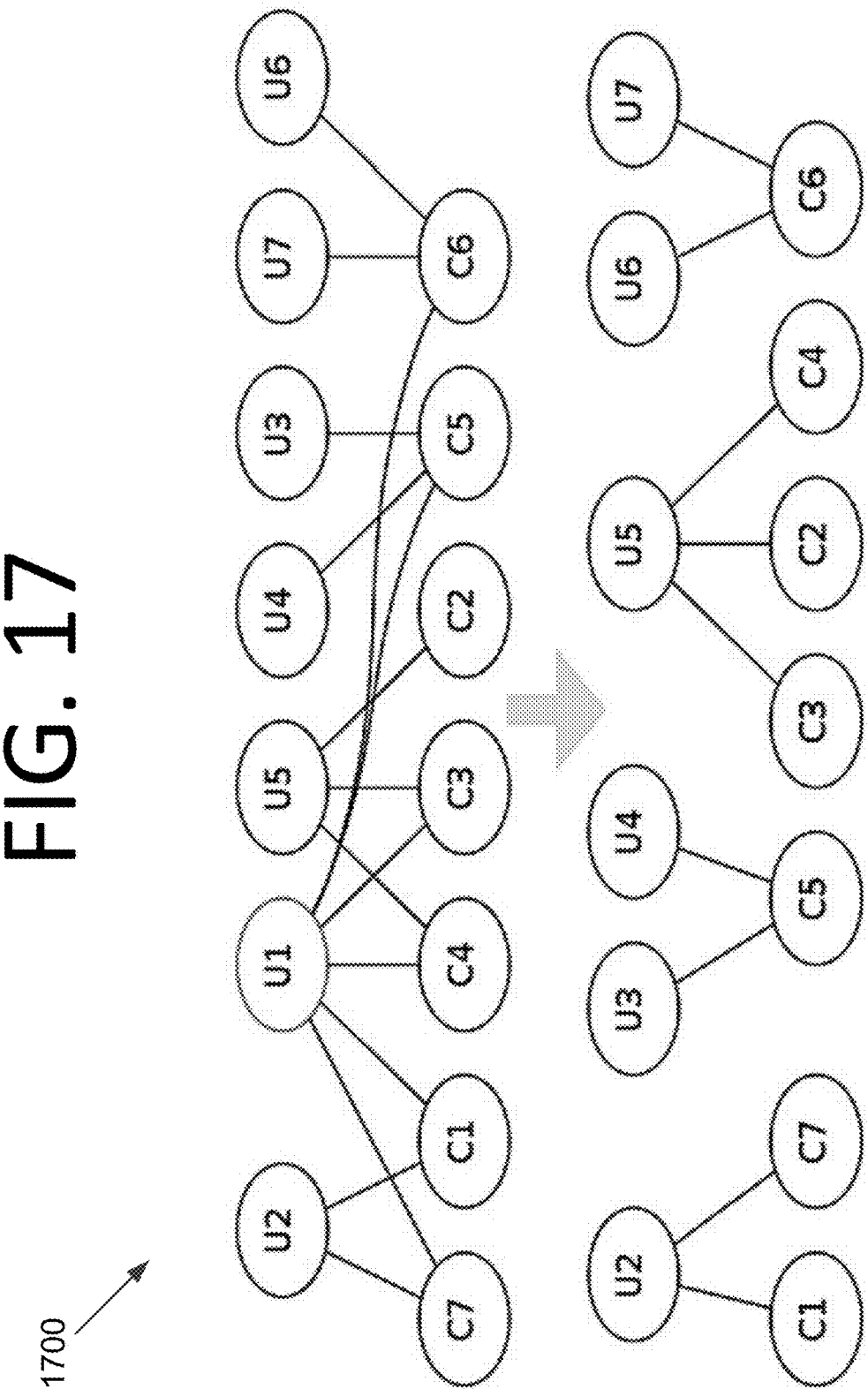
FIG. 17 is a graph illustrating users and computers in a Bipartite Authentication Graph (BAG), according to an embodiment of the present invention.

For the BAG analysis, shorter time periods of one day and less are the most useful due to better matching to credential life times (e.g., Kerberos tickets generally have lifespans of one day or less). For example, when a BAG is built over a typical one-day time period from the larger example data set above, a graph was generated with 8699 users and 10,141 computers. It has a connected component count of 1426 with the majority of users and computers being in the primary component. When the user vertex that has the highest degree (i.e., 132) is removed, the component count is increased by 38. A simplified visualization of this change for users ($U_i \in U(B)$) and computers ($C_i \in V(B)$) in a simplified BAG is shown in graph 1700 of FIG. 17.

The top graph shows a subset of a real system-level credential found to span a significant number of other systems within the example one-month data set. The lower graph shows that when the access of user U1 is removed or otherwise controlled, the resulting graph shows a substantial increase in the number of connected component subgraphs. Understanding opportunities and changes of this type can be used to reduce the impact of credential stealing that allows a malicious actor to jump across discrete groupings of users.

Interestingly, when the BAGs from time periods prior to the month with the red team compromise data are considered, the top two connecting users by degree were both compromised. One of the users was a system (non-person) account used to do health monitoring over a large set of computers. As a result of the identification through BAG analysis, this system account has been operationally broken up into multiple system accounts that reduce the risk and impact of compromise.

FIG. 18 is a flowchart 1800 illustrating a process for determining a PAS, according to an embodiment of the present invention. The process begins with determining a set of reachable vertices and a respective distance to each of the vertices from a starting vertex within a graph at 1810. The set of reachable vertices represent computers that a computer, represented by the starting vertex, has authenticated to during a period of time (e.g., two hours, a day, a week, a month, etc.). Next, the set of reachable vertices and the respective distance to each of the vertices is output at 1820 as a PAS for the starting vertex of the graph. In certain embodiments, these determinations may be time-constrained.

FIG. 19 is a flowchart 1900 illustrating a process for determining a PAS for review by a security analyst, according to an embodiment of the present invention. The process begins with computing statistical measures at 1910 to compare one or more attributes of a PAS based on user authentication events for the computing system with one or more attributes indicative of normal user behavior. It is then determined whether a computer or its user are potentially malicious based on the computed statistical measures at 1920. Next, the PAS is output for review by a security analyst at 1930 to determine whether the PAS represents a compromised computer or malicious user. In certain embodiments, this comparison is accomplished via the estimation of a statistical model for baseline behavior of these attributes, followed by the evaluation of probabilities of observed attributes under the baseline models. In some embodiments, the one or more attributes may include PAS diameter, where potentially malicious behavior is indicated by a PAS diameter for the computer that is larger than a normal PAS diameter by an amount specific to the PAS being considered and its historical variability. In certain embodiments, the one or more attributes include attributes that have a p-value of 0.01 or less.

FIG. 20 is a flowchart 2000 illustrating a process for identifying potentially malicious computers or users, according to an embodiment of the present invention. The process begins with comparing PASs for a computer over a series of sliding time windows at 2010. It is then determined, based on a statistical comparison of the PASs, whether a deviation between an estimated statistical model and observed PAS attributes at a given time window exceeds an expected deviation for a user at 2020. When the expected deviation is exceeded at 2030, an identification of the computer is output at 2040 for review by a security analyst to determine whether the computer has been compromised or a malicious user is using the computer. In some embodiments, the sliding time window may be two hours. In certain embodiments, the deviation level indicating potential compromise takes into account the variability of the history of the observed model in order to report statistically significant deviations above normal variation. The deviation level may also be dependent on an externally provided threshold to allow users of the system to receive alerts at a prescribed average reporting rate.

FIG. 21 is a block diagram illustrating a computing system 2100 configured to differentiate between authorized users and intruders in a network, and/or to detect inappropriate behavior by otherwise authorized users, according to an embodiment of the present invention. Computing system 2100 includes a bus 2105 or other communication mechanism for communicating information, and processor(s) 2110 coupled to bus 2105 for processing information. Processor(s) 2110 may be any type of general or specific purpose processor, including a central processing unit ("CPU") or application specific integrated circuit ("ASIC"). Processor(s) 2110 may also have multiple processing cores, and at least some of the cores may be configured to perform specific functions. Multi-parallel processing may be used in some embodiments. Computing system 2100 further includes a memory 2115 for storing information and instructions to be executed by processor(s) 1410. Memory 2115 can be comprised of any combination of random access memory (RAM), read only memory (ROM), flash memory, cache, static storage such as a magnetic or optical disk, or any other types of non-transitory computer-readable media or combinations thereof. Additionally, computing system 2100 includes a communication device 2120, such as a transceiver and antenna, to wirelessly provide access to a communications network.

Non-transitory computer-readable media may be any available media that can be accessed by processor(s) 2110 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 2110 are further coupled via bus 2105 to a display 2125, such as a Liquid Crystal Display (LCD), for displaying information to a user. A keyboard 2130 and a cursor control device 2135, such as a computer mouse, are further coupled to bus 2105 to enable a user to interface with computing system. However, in certain embodiments such as those for mobile computing implementations, a physical keyboard and mouse may not be present, and the user may interact with the device solely through display 2125 and/or a touchpad (not shown). Any type and combination of input devices may be used as a matter of design choice.

Memory 2115 stores software modules that provide functionality when executed by processor(s) 2110. The modules include an operating system 2140 for computing system 2100. The modules further include a malicious user detection module 2145 that is configured to detect compromised computers using any of the approaches discussed herein or derivatives thereof. Computing system 2100 may include one or more additional functional modules 2150 that include additional functionality.

One skilled in the art will appreciate that a "system" could be embodied as an embedded computing system, a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 18-20 may be performed by a computer program, encoding instructions for the nonlinear adaptive processor to perform at least the processes described in FIGS. 18-20, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the processes described in FIGS. 18-20, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

A useful and interesting way to examine and analyze large-scale user authentication activity within a centralized network authentication system has been demonstrated. This approach has shown initial value in differentiating administrative and general users, as well as for finding compromised users within an enterprise network. In addition, a method of objectively representing how authentication activity across users and computers is demonstrated that can increase the risk of credential loss and show how mitigation scenarios effect such risk.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
   determining, by a computing system, a set of reachable vertices and a respective distance to each of the reachable vertices from a starting vertex within a graph, wherein the set of reachable vertices represent other computers that a computer, represented by the starting vertex, has authenticated to during a period of time on behalf of its user;
   outputting the set of reachable vertices and the respective distance to each of the vertices, by the computing system, as a Person's Authentication Subgraph (PAS) for the starting vertex of the graph;
   comparing, by the computing system, a plurality of PASs for a computer over a series of sliding time windows; and
   determining, by the computing system, based on a statistical comparison of the PASs, whether a deviation between an estimated statistical model and observed PAS attributes at a given time window exceeds an expected deviation for a user, wherein
   a level of deviation indicating potential compromise takes into account variability of a history of behavioral observations in order to report statistically significant deviations above normal variation by an externally provided threshold to allow users to receive alerts at a prescribed average reporting rate.

2. The computer-implemented method of claim 1, wherein the determining of the set of reachable vertices and the respective distance to each of the reachable vertices is time-constrained.

3. The computer-implemented method of claim 1, further comprising:
   determining, by the computing system, that a computer or its user is potentially malicious by computing statistical measures to compare one or more attributes of the PAS based on user authentication events for the computer with one or more attributes indicative of normal user behavior.

4. The computer-implemented method of claim 3, further comprising:
   estimating, by the computing system, a statistical model for baseline behavior of the attributes; and
   evaluating probabilities of observed attributes, by the computing system, under the baseline models.

5. The computer-implemented method of claim 3, wherein the one or more attributes comprise PAS diameter, wherein potentially malicious behavior is indicated by a PAS diameter for the computer that is larger than a normal PAS diameter by an amount specific to the PAS being considered and its historical variability.

6. The computer-implemented method of claim 3, wherein one or more differentiating attributes of the one or more attributes comprise attributes that have a p-value of 0.01 or less.

7. The computer-implemented method of claim 1, further comprising: outputting an identification of the computer, the computing system, for review by a security analyst to determine whether the computer has been compromised or a malicious user is using the computer.

8. The computer-implemented method of claim 1, wherein each sliding time window is a fixed period of time.

9. A computer-implemented method, comprising:
   determining, by a computing system, that a computer or its user is potentially malicious by computing statistical measures to compare one or more attributes of a Person's Authentication Subgraph (PAS) based on user authentication events for the computer with one or more attributes indicative of normal user behavior;
   estimating, by the computing system, a statistical model for baseline behavior of the attributes;
   evaluating probabilities of observed attributes, by the computing system, under the baseline models;
   outputting the PAS, by the computing system, for review by a security analyst to determine whether the PAS represents a compromised computer or malicious user when the PAS exceeds a statistical threshold;
   comparing, by the computing system, a plurality of PASs for a computer over a series of sliding time windows; and
   determining, by the computing system, based on a statistical comparison of the PASs, whether a deviation between an estimated statistical model and observed PAS attributes at a given time window exceeds an expected deviation for a user, wherein
   a level of deviation indicating potential compromise takes into account variability of a history of behavioral observations in order to report statistically significant deviations above normal variation by an externally provided threshold to allow users to receive alerts at a prescribed average reporting rate.

10. The computer-implemented method of claim 9, wherein the one or more attributes comprise PAS diameter, wherein potentially malicious behavior is indicated by a PAS diameter for the computer that is larger than a normal PAS diameter by an amount specific to the PAS being considered and its historical variability.

11. The computer-implemented method of claim 9, wherein one or more differentiating attributes of the one or more attributes comprise attributes that have a p-value of 0.01 or less.

12. A computer-implemented method, comprising:

comparing, by a computing system, a plurality of Person's Authentication Subgraphs (PASs) for a computer over a series of sliding time windows;

determining, by the computing system, based on a statistical comparison of the PASs, whether a deviation between an estimated statistical model and observed PAS attributes at a given time window exceeds an expected deviation for a user; and when the expected deviation for the user has been exceeded, outputting an identification of the computer, the computing system, for review by a security analyst to determine whether the computer has been compromised or a malicious user is using the computer, wherein a level of deviation indicating potential compromise takes into account variability of a history of behavioral observations in order to report statistically significant deviations above normal variation by an externally provided threshold to allow users to receive alerts at a prescribed average reporting rate, and each PAS comprises a set of reachable vertices and a respective distance to each of the reachable vertices from a starting vertex within a graph, the set of reachable vertices representative of other computers that a computer, represented by the starting vertex, has authenticated to during a period of time.

13. The computer-implemented method of claim 12, wherein each sliding time window is a fixed period of time.

* * * * *